July 30, 1940.  J. B. GEERS ET AL  2,209,771
CASH REGISTER
Filed Jan. 18, 1936  13 Sheets-Sheet 1

Inventor
John B. Geers and
Arthur R. Colley
By
Earl Beust
Their Attorney

July 30, 1940.  J. B. GEERS ET AL  2,209,771
CASH REGISTER
Filed Jan. 18, 1936  13 Sheets-Sheet 2

Inventor
John B. Geers and
Arthur R. Colley
By
Carl Beust
Their Attorney

Inventor
John B. Geers and
Arthur R. Colley
By *Carl Beust*
Their Attorney

July 30, 1940.　　　　J. B. GEERS ET AL　　　　2,209,771
CASH REGISTER
Filed Jan. 18, 1936　　　　13 Sheets-Sheet 5

Inventor
John B. Geers and
Arthur R. Colley
By
Carl Beust
Their Attorney

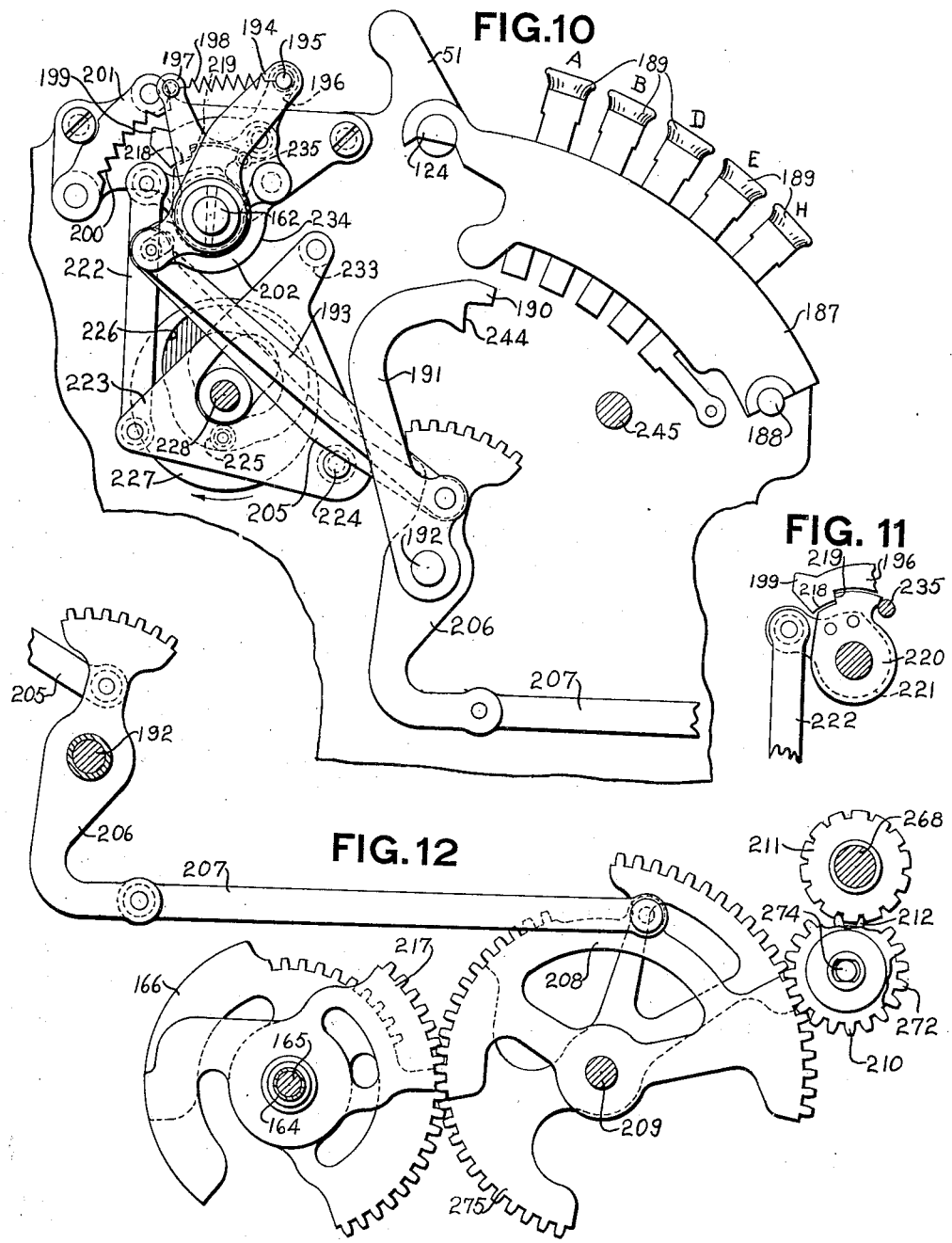

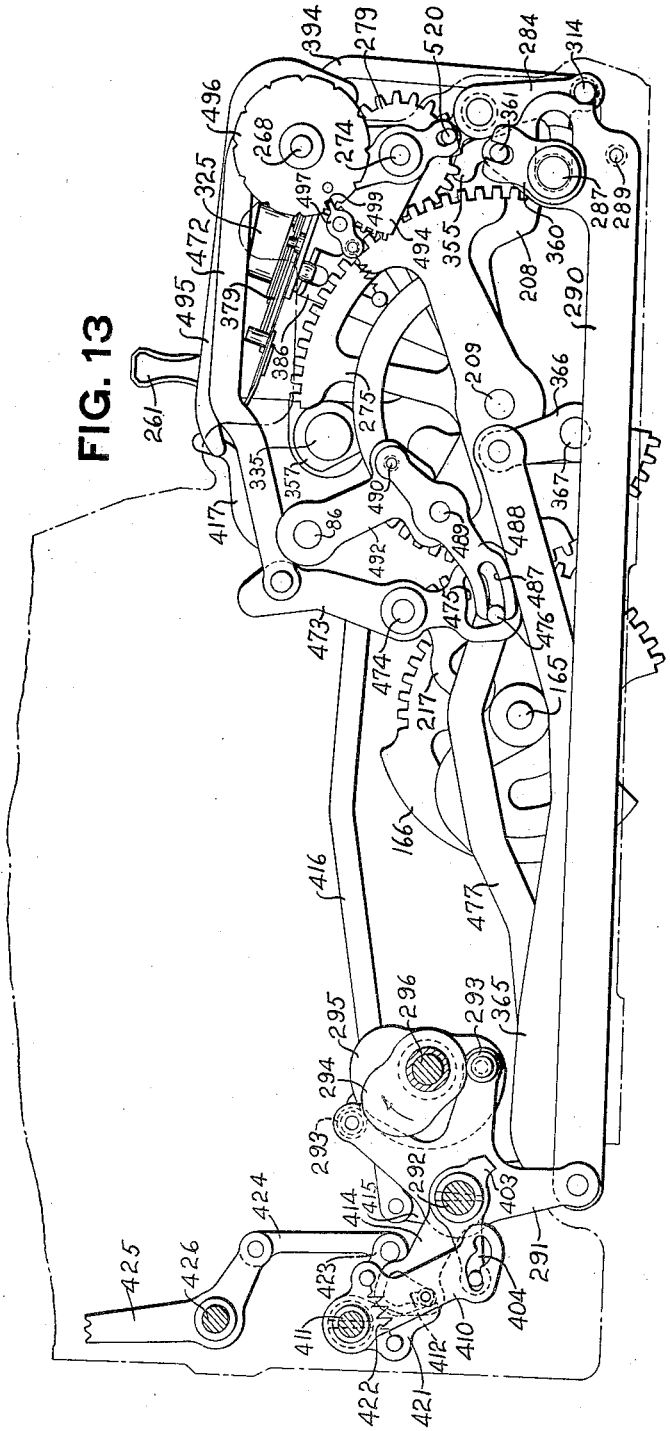
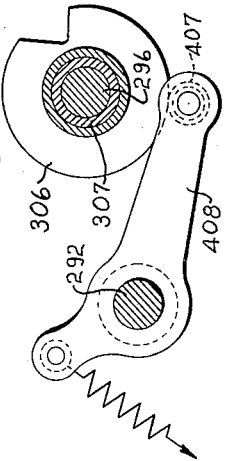
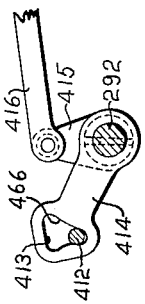

July 30, 1940.　　J. B. GEERS ET AL　　2,209,771
CASH REGISTER
Filed Jan. 18, 1936　　13 Sheets-Sheet 8
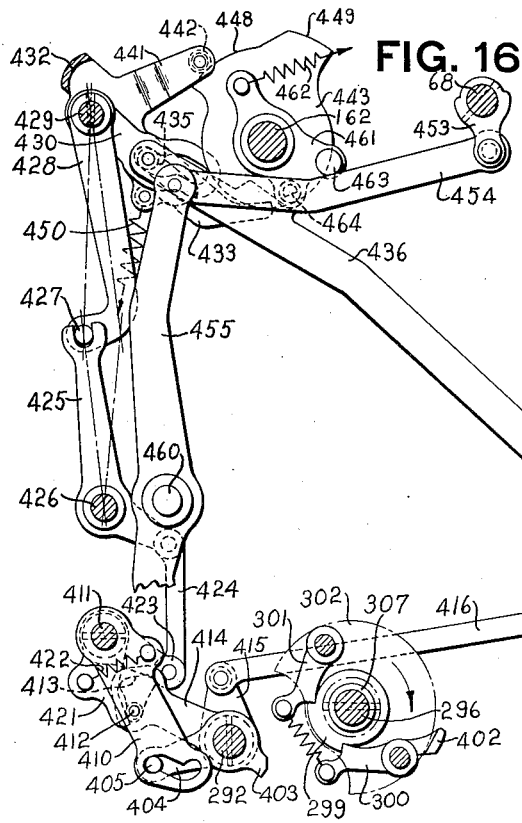
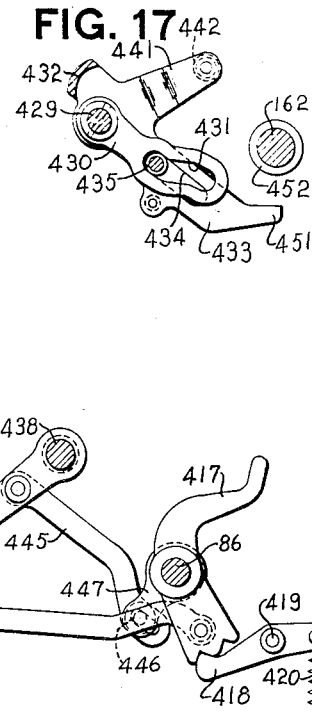
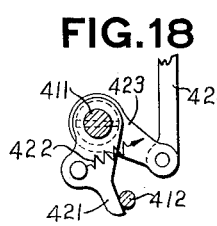
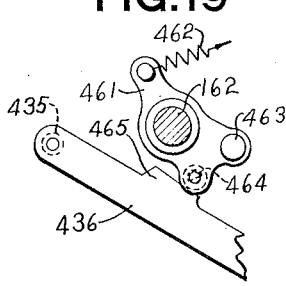
FIG. 20
| 533 | 0 3 1 1 | $0.001.00 | Ch A |
| 533 | 0 3 1 1 | $0.002.50 | Ch A |
| 533 | 0 3 1 1 | $0.005.41 | Ch A |
| 533 | 0 3 1 1 | $0.008.91 | Ch AZ |
| 533 | 0 3 1 2 | $0.009.11 | Ca E |
| 533 | 0 3 1 3 | $0.003.50 | Ch D |
| 533 | 0 3 1 4 | $0.001.25 | Ca H |
| 533 | 0 3 1 4 | $0.005.11 | Ca H |
| 533 | 0 3 1 4 | $0.006.36 | Ca HZ |
Inventor
John B. Geers and
Arthur R. Colley
By Carl Beust
Their Attorney

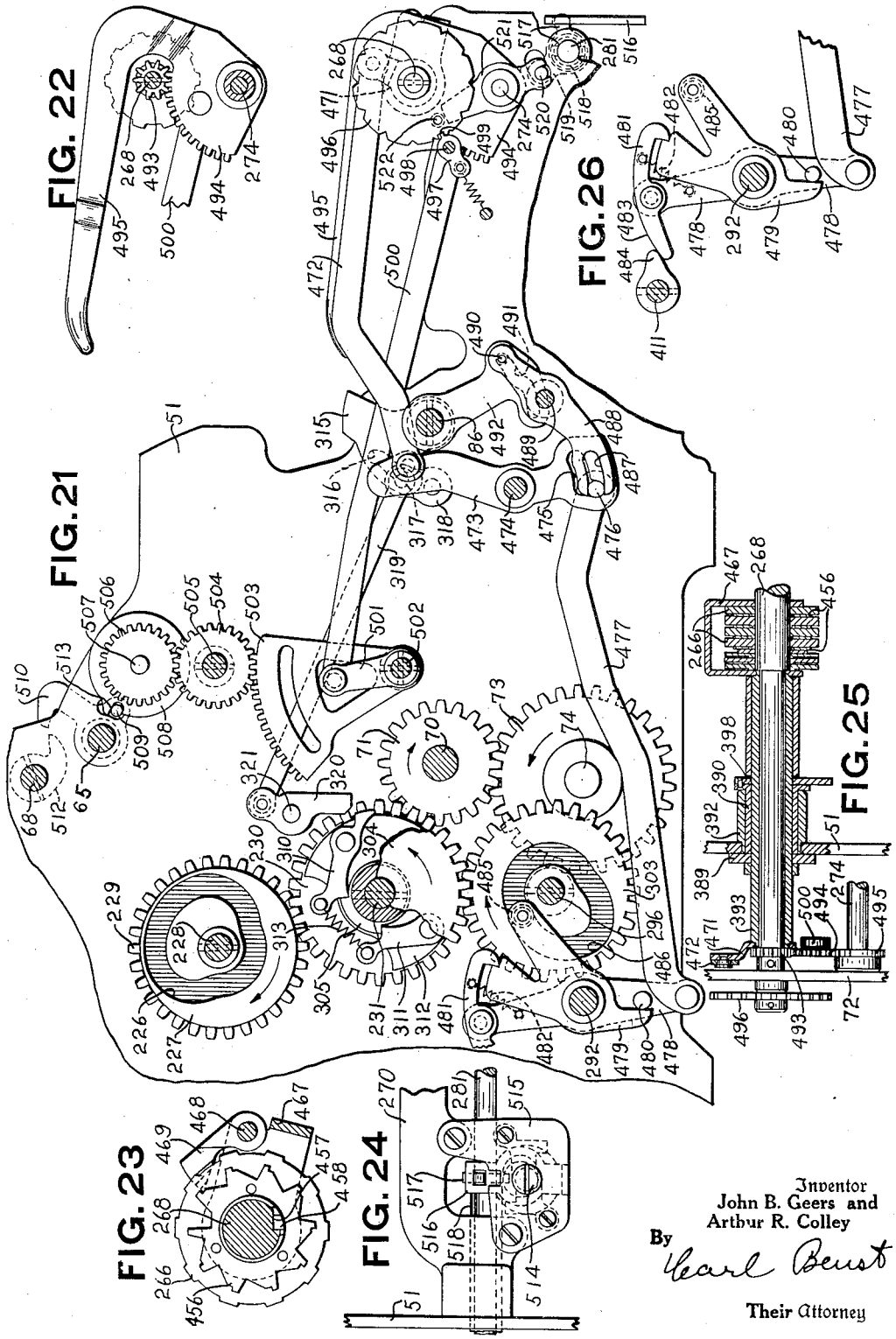

July 30, 1940.  J. B. GEERS ET AL  2,209,771
CASH REGISTER
Filed Jan. 18, 1936   13 Sheets-Sheet 10
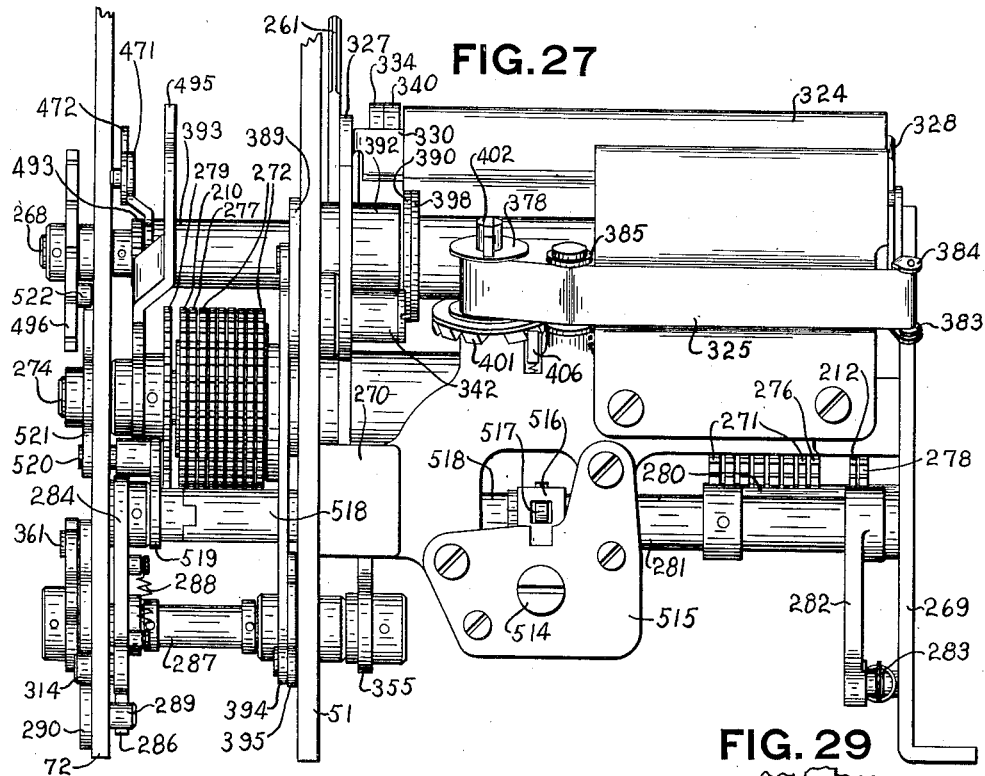
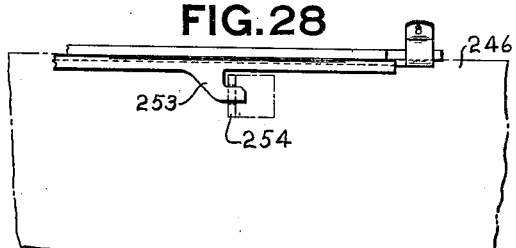
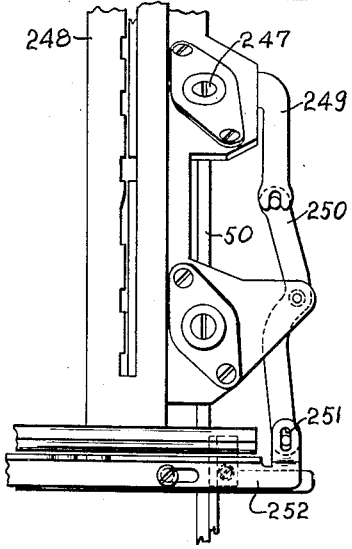
Inventor
John B. Geers and
Arthur R. Colley
By Karl Benst
Their Attorney July 30, 1940.　　　　J. B. GEERS ET AL　　　　2,209,771
CASH REGISTER
Filed Jan. 18, 1936　　　　13 Sheets-Sheet 11
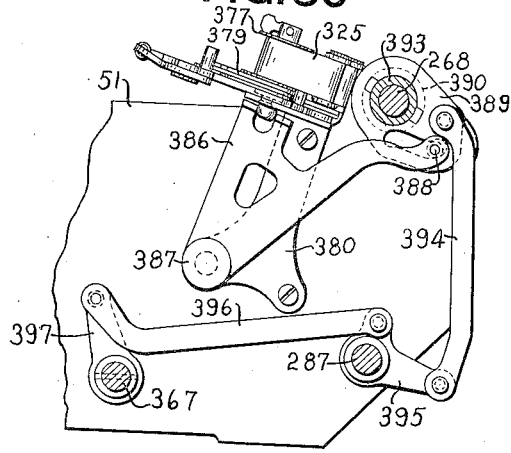
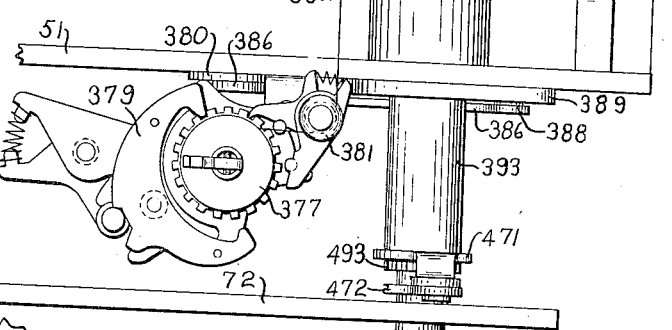
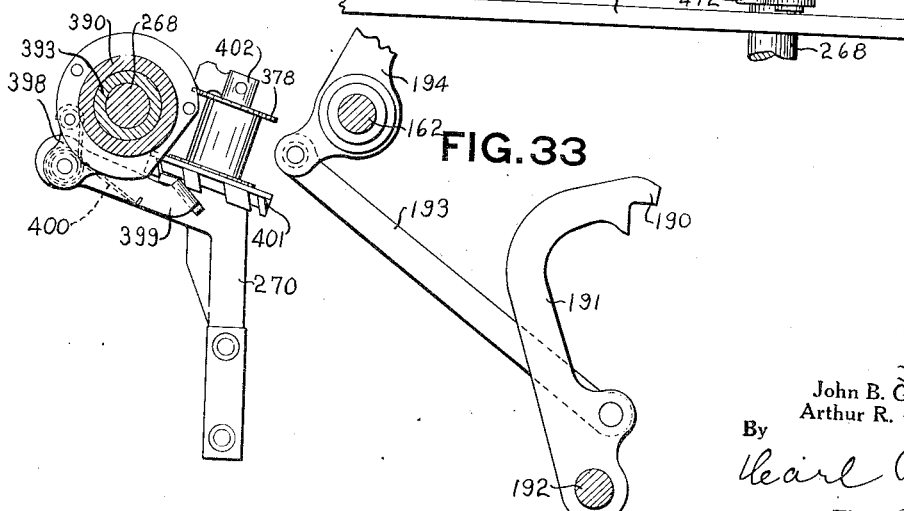
Inventor
John B. Geers and
Arthur R. Colley
By
Hearl Bunst
Their Attorney July 30, 1940.  J. B. GEERS ET AL  2,209,771
CASH REGISTER
Filed Jan. 18, 1936  13 Sheets-Sheet 12

Inventor
John B. Geers and
Arthur R. Colley
By Carl Bernt
Their Attorney

July 30, 1940.  J. B. GEERS ET AL  2,209,771
CASH REGISTER
Filed Jan. 18, 1936  13 Sheets-Sheet 13
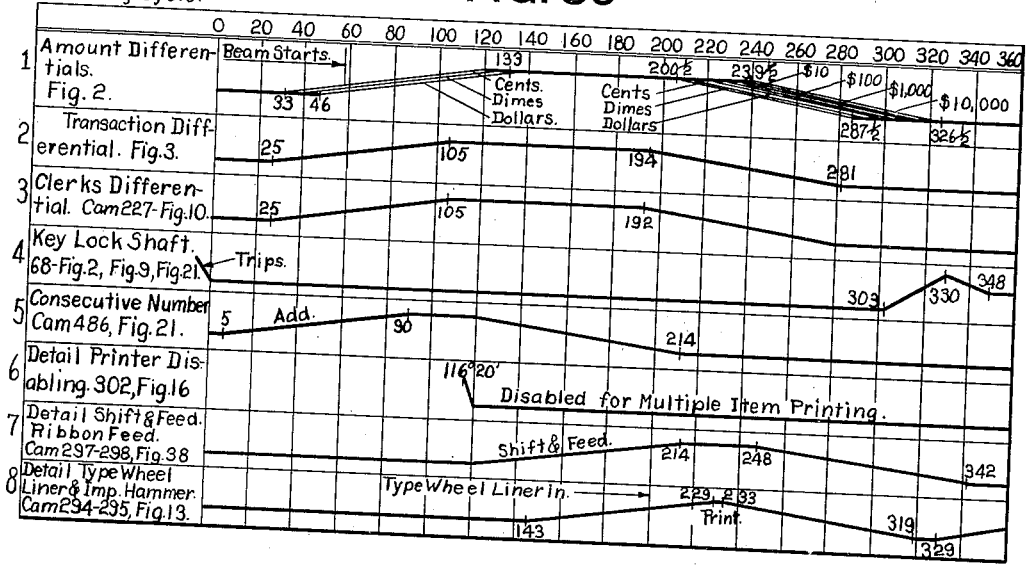
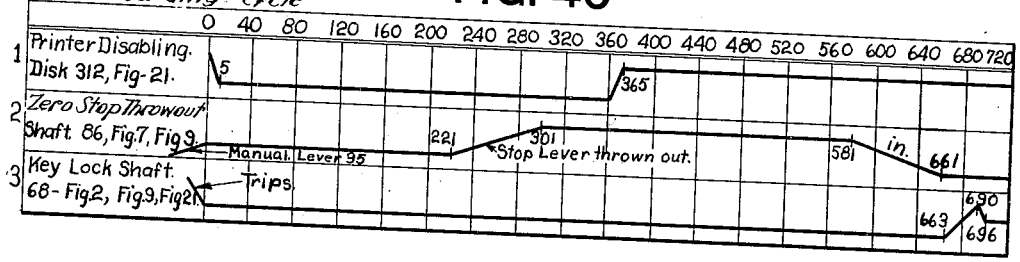
Inventor
John B. Geers and
Arthur R. Colley
By
Their Attorney Patented July 30, 1940

2,209,771

UNITED STATES PATENT OFFICE 2,209,771

CASH REGISTER

John B. Geers and Arthur R. Colley, Dayton, Ohio, assignors to The National Cash Register Company, Dayton, Ohio, a corporation of Maryland Application January 18, 1936, Serial No. 59,779

16 Claims. (Cl. 235—2)

This invention relates to cash registers and like machines, but is more particularly directed to a novel printing mechanism for machines of the class illustrated and described in Letters Patent of the United States No. 1,394,256, issued October 18, 1921, to F. L. Fuller, Patent No. 1,619,796, granted March 1, 1927, to B. M. Shipley, and Patents No. 1,817,883, and 1,865,147, issued respectively August 4, 1931, and June 28, 1932, to B. M. Shipley.

One of the objects of this invention is to provide a cash register with a novel record printing device, said device being centrally located at the front of the machine in convenient position for observation and adjustment.

Another object is to contrive a novel record material supporting means that may be moved to a more accessible position to facilitate the removal and insertion of record material.

Still another object is to devise novel means to control the operation of the printing device.

A further object is to provide a closure to render the printing device accessible only to authorized persons.

A still further object is to construct a novel differential mechanism for one of the control banks.

Other objects of the present invention are, to devise means to control the consecutive number operating mechanism in total recording operations, to provide means to prevent starting the machine while the consecutive number is being reset, and to devise means to control the consecutive number operating mechanism in multiple item operations.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Of said drawings:

Fig. 10 is a side elevation, as observed from the left of the machine, showing the differential mechanism associated with the bank of clerks' keys.

Fig. 11 is a detail view of the clerks differential drive arm.

Fig. 12 shows in detail the mechanism that connects the clerks' differential mechanism with its type carrier.

Fig. 13 is a left side elevation of the operating mechanism for the impression hammer, the type wheel liner and the consecutive number operating mechanism.

Fig. 14 is a detail view of the arm and associated mechanism for controlling the operation of the paper feeding and impression mechanism.

Fig. 15 is a detail view of the aliner for the cam cluster for the impression operating mechanism and the paper feed mechanism.

Fig. 16 is a detail view of the mechanism for controlling the paper feed and impression mechanism.

Figs. 17, 18 and 19 are detail views of parts of the mechanism shown in Fig. 16.

Fig. 20 is a facsimile of a fragment of a record strip printed by the present machine.

Fig. 21 is a left side elevation of the mechanism for operating and controlling the consecutive number type wheels.

Fig. 22 is a detail of the resetting lever for the consecutive number type wheels.

Fig. 23 is a detail view of the step-by-step feeding means for the consecutive number wheels.

Fig. 24 is a front view of the lock mechanism for the resetting means for the consecutive number type wheels.

Fig. 25 is a sectional view of the consecutive number type wheel line.

Fig. 26 is a detail view of the cam lever and associated latch mechanism that operate the consecutive number feed.

Fig. 27 is a front view of the printing mechanism.

Fig. 28 is a detail view of the locking bar for the closure that encloses the printing mechanism.

Fig. 29 is a front view of the lock for the printer closure.

Fig. 30 is a left end view of the driving mechanism for the inking ribbon.

Fig. 31 is a plan view of the inking ribbon mechanism and the type wheel line.

Fig. 32 is an end view of the feeding mechanism for one of the ribbon spools.

Fig. 33 is a detail view of the clerks differential stop arm and associated mechanism.

Fig. 39 is a time chart depicting graphically the movements of various mechanisms in adding operations.

Fig. 40 illustrates the movements of various mechanisms in total recording operations.

GENERAL DESCRIPTION

Figure 1:
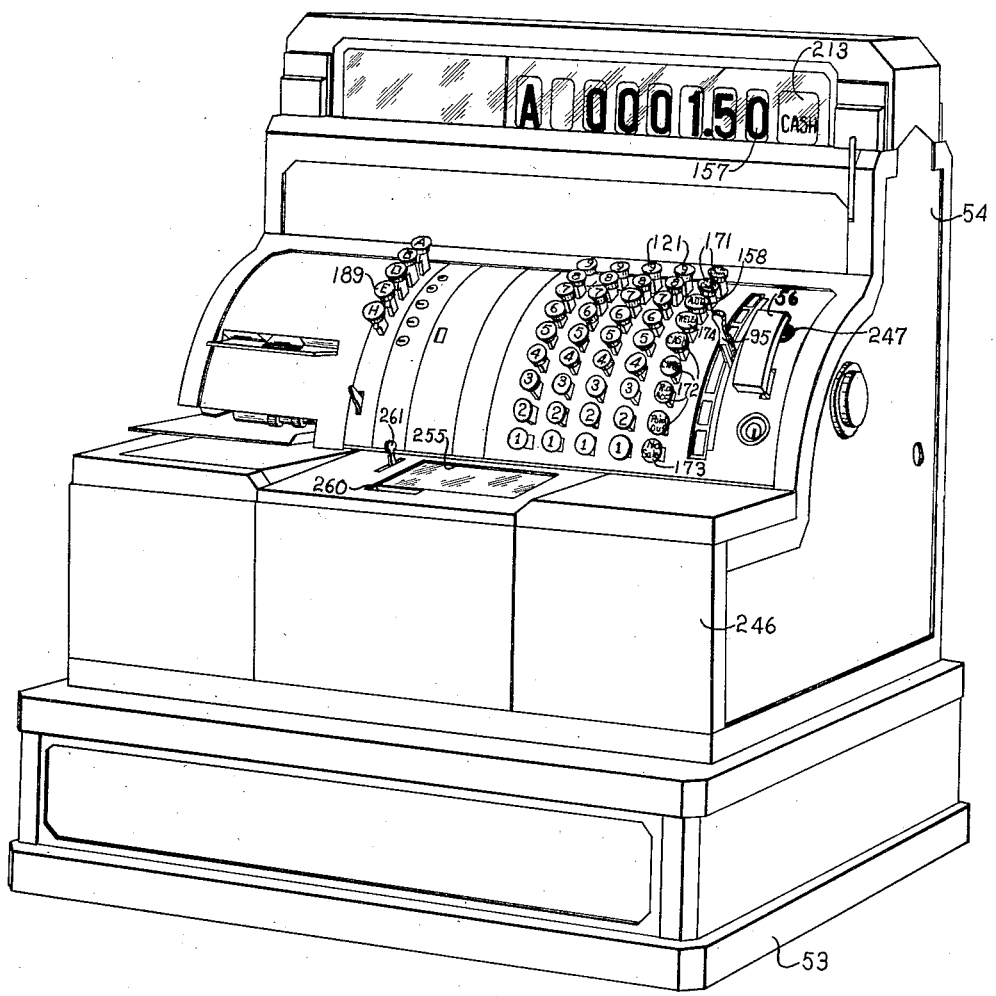
Fig. 1 is a perspective view of the complete machine.

The machine of the present invention embodies a printing device for recording data on a record strip, said printing device being centrally located at the front of the machine in a convenient position for observation and adjustment by the operator.

A normally locked closure renders the printing device inaccessible to unauthorized persons. An opening in the closure registers with a table over which the record strip passes and provides a convenient means for autographing desired data opposite the printed entries on the record strip.

The machine embodying this invention has a plurality of denominational rows of amount keys and each row of keys has associated therewith an amount differential mechanism which, in adding operations, actuates the wheels of the selected totalizer or totalizers commensurate with the depressed amount keys. Each amount differential is operatively connected to and positions an indicator and type carrier in accordance with the depressed amount keys.

There are two banks of control keys, namely, transaction and clerks, and there is a line of interspersed totalizers for each of the control banks. The bank of transaction keys and the bank of clerks keys each has a differential mechanism, similar to the amount differentials, which shifts its corresponding totalizer line laterally to aline the set of totalizer wheels on said line, corresponding to the depressed transaction and clerks keys, with the amount differentials. The transaction differential and the clerk's differential are operatively connected to corresponding printing wheels in the printing device, which, in cooperation with the impression mechanism, records symbols corresponding to the type of transaction being performed and to the clerk performing the transaction. Likewise, the differentials of the two control banks are operatively connected to and position their respective indicators commensurate with the depressed control keys. In adding operations, the control keys set up a condition that causes their respective totalizer lines to be engaged with the amount differentials.

The present machine is arranged to perform single item and multiple item transactions and to this end the transaction bank has two groups of keys, namely, single and multiple item keys. A single item transaction is one in which a single item is entered in a single operation of the machine and a multiple item transaction is one in which several items are entered in as many operations of the machine, all of said items being entered under one transaction heading such as "Item cash" or "Item charge." Corresponding single item and multiple item keys select the same set of totalizer wheels on the transaction line and, in addition to this selection, the multiple item keys select a single set of wheels of a multiple item totalizer line for engagement with the amount differentials to accumulate the total amount of the multiple item transaction. After completing the entries in a multiple item transaction, it is necessary to clear the multiple item totalizer before another multiple item transaction or a single item transaction can be initiated. This is done by moving the total control lever to a position to control a reset operation involving the multiple item totalizer on the #1 totalizer line.

The different totalizer lines are selected for engagement with the actuators in total recording, either reading or resetting, operations by means of a total control lever. The transaction keys and the clerks keys function the same in total recording operations as in adding operations, to cause the corresponding set of totalizer wheels to be alined with the amount differentials. In total recording operations, the differentials rotate the selected totalizer wheels reversely until said wheels are stopped in zero position by a long tooth thereon contacting a latch device. This positions the amount type wheels and the indicators commensurate with the amount on the wheels of the selected totalizer. A type wheel positioned by the total control lever records the type of operation, add, read, or reset, being performed.

The type wheel line of the printing device carries a plurality of consecutive number type wheels, which, in cooperation with the impression mechanism, records each single item transaction and each multiple item transaction, which, as stated before, consists of a series of item entering operations under one transaction heading.

The consecutive number mechanism does not operate during any total recording operations. Novel mechanism is provided to control the consecutive number mechanism during the different types of machine operations.

The type wheel line also supports a plurality of wheels which may be set by hand to record or print an identifying number, such as department number, register number, store number, or the like.

The supply roll, the receiving reel and the guide studs for the detail record material are supported in a rockable frame, which may be moved to a more accessible position for the removal and insertion of record material. The record strip and a reversible inking ribbon are interposed between an impression hammer and the type wheels, and at the proper time the impression hammer carries the inking ribbon and the record strip into contact with the type wheels to record the transaction being performed.

The detail record strip feeding mechanism and the impression mechanism are normally disabled during the listing of items in a multiple item operation. However, during the compulsory recording of the total of the multiple items, the record strip feeding and impression mechanisms are rendered effective to record the total of the multiple items.

A manipulative device is provided to render the disabling mechanism for the record strip feeding and the impression mechanism ineffective. With this manipulative device in one position, the record strip feeding and the impression mechanisms function irrespective of whether the operation is a single item, multiple item, or total recording operation. With the manipulative device in its other position, the mechanism that disables the record strip feeding and the impression mechanisms during multiple item operations becomes effective. However, in total recording operations the disabling mechanism is always rendered ineffective, as it is very important that the result of read and reset operations be recorded.

In the ensuing pages the mechanism pertinent to the instant invention will be described in detail.

Detailed Description

The mechanism of the present invention is embodied in the well known type of cash register fully disclosed in the patents referred to at the beginning of this specification. For this reason mechanism of standard construction which is not pertinent to the present invention will be but briefly described.

Machine framework

Most of the mechanism of the instant machine is supported between a right frame 50 (Figs. 1, 2 and 9) and a left frame 51, both of which are secured to a machine base 52, which is in turn attached to the top of a drawer cabinet 53. The entire machine is enclosed by a suitable case or cabinet 54, which is secured to the machine base and to various brackets attached to the top of the drawer cabinet. A back plate 55 (Fig. 2) and various crossrods and bars extending between the frames 50 and 51, assist in supporting the machine mechanism.

Operating mechanism

Figure 8:
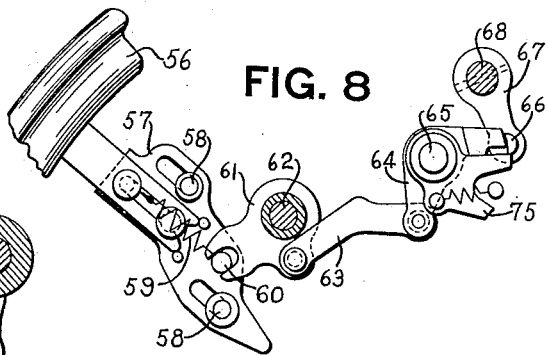
Fig. 8 illustrates in detail the machine starting bar and connecting mechanism that controls the release of the key lock line.

The machine of the instant invention is preferably operated by means of an electric motor (not shown). Depressing the usual starting bar 56 (Figs. 8 and 9), which is removably connected to a plate 57, slidably mounted on studs 58 secured in the frame 50, causes said starting bar to impart downward sliding movement to said plate 57 against the tension of a spring 59, one end of which is attached to a stud 60 secured in said plate 57. Movement of the plate 57, by means of the stud 60, in cooperation with a bifurcated extension of a crank 61, causes said crank to pivot counterclockwise on a trunnion 62 secured to the right frame 50. Counterclockwise movement of the crank 61, by means of a link 63, connecting said crank and a release pawl 64 loose on a No. 1 totalizer reset shaft 65 journaled in the frames 50 and 51, rocks said release pawl 64 counterclockwise to move a forward extension thereof out of the path of an arcuate surface of a half-round stud 66 secured in a crank 67 in turn secured to a key lock shaft 68 journaled in the frames 50 and 51. Movement of the shaft 68 is illustrated graphically for adding operations in space 4, Fig. 39, and for total recording operations in space 3, Fig. 40. Moving the pawl 64 out of the path of the stud 66 releases the key lock shaft 68 to the action of a spring 69 which imparts clockwise movement to said shaft, see space 4, Fig. 39.

Clockwise movement of the shaft 68 closes the motor switch and causes the motor to be clutched to a driving pinion 42 (Fig. 5) loose on a stud 43, secured in a main printer frame 72 in turn secured to the base 52 and connected by various studs to the left frame 51. The pinion 42 meshes with a gear 44 loose on a stud 45 in the frame 72. The gear 44 meshes with a gear 46 integral with a similar gear 47 rotatably supported by a stud in a bracket 48 secured to the frame 72. The gear 47 meshes with a gear 49 secured on a short shaft 70 journaled in the frames 51 and 72. Also secured on the shaft 70 is a gear 71 which meshes with a gear 73 (Fig. 21) secured to a main drive shaft 74 journaled in the frames 50 and 51. Rotation of the motor drives the shaft 74 counterclockwise, as viewed in Fig. 21, and clockwise as viewed in Fig. 9. After the shaft 74 has completed the necessary number of revolutions to effect the type of operation being performed, the key lock shaft 68 (Figs. 8 and 9) is restored counterclockwise to untripped position, space 4, Fig. 39, and space 3, Fig. 40, thus permitting the spring 59 to return the starting bar 56 upwardly and the release pawl 64 clockwise into the path of the stud 66 to restrain releasing movement of the shaft 68. The restoring of the key lock shaft 68, is effected at the proper time by means of cycle-controlling mechanism, which will be explained later herein.

In case the starting bar 56 (Figs. 8 and 9) is accidentally or inadvertently retained depressed at the end of a machine operation, a non-repeat pawl 75 fulcrumed on the shaft 65 is spring-urged into the path of the stud 66, upon restoration of the key lock shaft 68, to obstruct releasing movement of said shaft. This prevents a repeat operation of the machine as the machine cannot again be set in motion until the starting bar 56 is returned upwardly by the spring 59. Upon restoration of the starting bar 56 the rearward extension of the pawl 64, which overlies the non-repeat pawl 75, returns said pawl clockwise to ineffective position as the release pawl 64 moves in the path of the stud 66. The non-repeat pawl 75 is slightly longer than the release pawl 64. This prevents the pawl 64 from stumbling on the stud 66 upon restoration of the starting bar 56 and causes said stud to obstruct counterclockwise movement of the pawl 75 to prevent said pawl from interfering with the releasing movement clockwise of the key lock shaft 68.

Cycle-controlling mechanism

Figure 9:
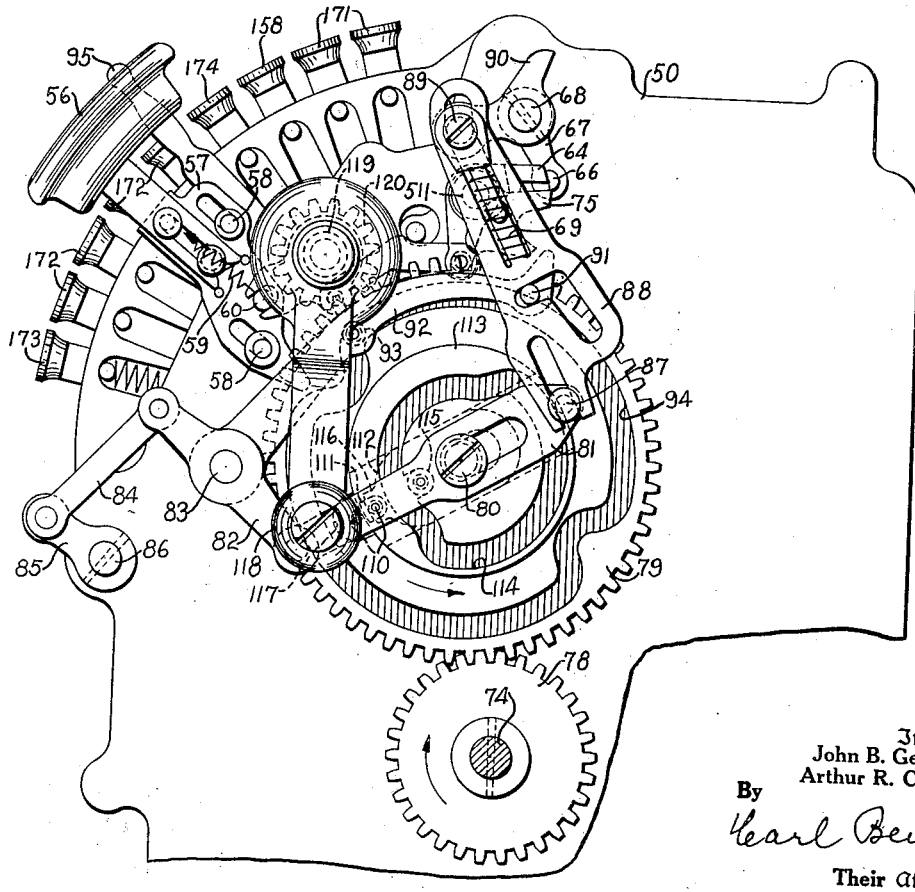
Fig. 9 is a side elevation, as observed from the right of the machine, showing the cycle-controlling mechanism.

In adding operations, the main drive shaft 74 makes one revolution clockwise or one cycle of movement, as viewed in Fig. 9, and one counterclockwise revolution, as viewed in Fig. 21, and in total recording operations said main drive shaft makes two revolutions or two cycles of movement. Rotation of the shaft 74 is governed by means of the cycle-controlling mechanism shown in Fig. 9, and which will now be described.

Secured on the main drive shaft 74 is a gear 78, which meshes with a large gear 79 turnably mounted on a stud 80 secured in the frame 50. A pitman 81 is slotted to embrace the stud 80. The lower end of said pitman is pivotally connected to one arm of a lever 82 loose on a stud 83 secured in the frame 50. A link 84 connects the lever 82 to a crank 85 secured on a zero stop throwout shaft 86 journaled in the frames 50 and 51. Movement of the shaft 86 is shown graphically in space 2 Fig. 40. The pitman 81 carries a stud 87 embraced by the bifurcated lower end of a link 88, the upper end of which is slotted to receive a stud 89 in an arm 90 secured to the key lock shaft 68. The link 88 has an L-shaped slot which cooperates with a stud 91 in a key release lever 92 fulcrumed on the stud 83 and having a roller 93 which extends within a camming groove 94 in the gear 79.

The functions of the machine (adding, reading and resetting) are controlled by means of a total control plate or lever 95 (Fig. 7) journaled on a stud 96 extending between two support plates (not shown) mounted on rods extending between the frames 50 and 51. When the total control plate 95 is in adding position, as here shown, the link 88 is positioned as shown in Fig. 9 so that the substantially horizontal branch of the L-shaped slot therein engages the stud 91 in the lever 92. In adding operations, the main drive shaft 74 and the gear 78 make one clockwise revolution and the gear 79 is driven one-half of a revolution in a counterclockwise direction by said gear 78. The camming groove 94 of the gear 79 is concentric with the center 80 with the exception of two identical diametrically opposed camming sections thereof. Near the end of an adding operation, one of the camming sections of the groove 94, in cooperation with roller 93, rocks the lever 92 first clockwise and then back to normal position. Clockwise movement of the lever 92 moves the link 88 downwardly, which, by means of the stud 89 in the arm 90, imparts counterclockwise movement to the key lock shaft 68 to restore said shaft to untripped position (space 4 Fig. 39) in the manner explained earlier herein. Counterclockwise restoring movement of the shaft 68 releases the depressed amount and transaction keys, opens the switch to the driving motor, and disengages the clutch mechanism that connects the motor to the machine mechanism.

In reading or resetting operations, it is necessary that the main drive shaft 74 make two clockwise revolutions in order to operate the machine through two cycles of movement necessary in such operations. This is accomplished in the following manner:

Moving the total control plate 95 (Fig. 7) away from adding position to either reading or resetting position causes a camming slot 97 therein, in cooperation with a stud 98 in a lever 99 pivoted at 100, to rock said lever 99 counterclockwise. Loose on the pivot 100 is an arm 101 yieldably connected to the lever 99 by means of a spring 102. The yieldable arm 101 and the lever 99 together form a camming slot 103 which, in cooperation with a roller 104, carried by an arm 105 secured to the zero stop throwout shaft 86, rocks said shaft clockwise when the lever 99 is rocked counterclockwise by the total control plate 95. Clockwise movement of the shaft 86 by means of the link 84 (Fig. 9) rocks the lever 82 clockwise to shift the pitman 81 forwardly. This movement of the pitman 81 shifts the link 88 clockwise a slight distance but not sufficiently to move the stud 91 out of the left-hand branch of the L-shaped slot in said link. The pitman 81 carries two studs 110, which embrace a right angled projection 111 of a slide 112 loose in an angular slot in the back face of a cam 113 loose in a recess in the face of the gear 79 and rotatably supported by the stud 80. The cycle control cam 113 has a cam groove 114 which cooperates with a roller 115 carried by the pitman 81. The slide 112 has a nose 116 arranged to engage a recess 117 in the gear 79 to lock the cam 113 to said gear in total recording operations.

When the total control plate 95 is in adding position, the pitman 81 is in the position shown in Fig. 9, in which position the nose 116 of the slide 112 is disengaged from the recess 117 and the roller 115 is engaged with a notch in the heart of the cam 113 to retain said cam stationary. Moving the total control plate away from adding position imparts clockwise movement to the shaft 86 (Fig. 9) and the lever 82, to shift the pitman 81 forwardly in the manner explained above. Forward movement of the pitman 81, in addition to moving the link 88, shifts the slide 112 forwardly to engage the nose 116 with the recess 117, to lock the cam 113 to the gear 79. Forward movement of the pitman 81 likewise disengages the roller 115 from the notch in the heart of the cam 113 and moves said roller into the cam groove 114. Depressing the starting bar 56 sets the machine in motion in the manner explained above for the performance of a total recording operation.

Near the end of the first clockwise revolution or first cycle of movement of the shaft 74, the cam groove 114 shifts the pitman 81 an additional distance forwardly to move the enlarged downwardly extending portion of the L-shaped slot in the link 88 opposite the stud 91. This provides clearance for said stud 91 and permits the irregular portion of the groove 94, in cooperation with the roller 93, to rock the restoring lever 92 back and forth without imparting releasing movement to the link 88 and the key lock shaft 68, thus causing the machine to operate through two cycles.

Near the end of the second cycle of movement, the groove 114 returns the pitman 81 rearwardly to reengage the upper left-hand branch of the L-shaped slot in the link 88 with the stud 91. It is therefore obvious that when the second irregular portion of the slot 94 rocks the release lever 92 back and forth, initial movement clockwise of said lever will move the link 88 downwardly to restore the key lock shaft 68 (space 3 Fig. 40) counterclockwise to terminate operation of the machine and to release the depressed transaction key. Return movement of the lever 92 and the link 88 permits the stud 66 to come to rest against the end of the release pawl 64. The link 88 continues to travel upwardly a slight distance independently of the shaft 68 to compress the spring 69 and to provide clearance for the stud 89, to permit clockwise releasing movement of the shaft 68 when the starting bar 56 is again depressed. Shifting the total control lever back to adding position disengages the slide 112 from the recess 117 and reengages the roller 115 with the notch in the heart of the cam 113.

In addition to the electric motor, a crank 118 (Fig. 9) is provided for manually operating the machine in emergencies occasioned by failure of the electrical current or accident to the motor. The crank 118 carries a stud which is journaled in a bushing 119 secured to the frame 50. Integral with the crank 118 is a pinion 120 which meshes with the gear 79 and thus provides a manual means of rotating the main drive shaft 74.

Amount keys and differentials

The machine embodying the instant invention has four rows of amount keys 121 (Figs. 1 and 2) each of said rows being mounted in a key frame 122 supported by rods 123 and 124 extending between the frames 50 and 51. In addition to the four banks of amount keys there are three overflow amount banks making a total of seven amount banks. There is an amount differential mechanism associated with each of the amount banks. Inasmuch as the amount banks and their associated differential mechanisms are substantially alike, it is believed that the explanation of one such amount bank and its differential mechanism will be sufficient for the purpose of this specification.

Depressing one of the amount keys 121 (Fig. 2) causes a camming projection 125 thereof, in cooperation with a stud 126, to rock a control plate 127 downwardly. The control plate 127 is rockably mounted in the frame 122 by means of arms 128 and 129, the lower ends of which are pivotally connected to opposite ends of said plate 127 and the upper ends of which are pivoted on stationary studs mounted in the frame 122. As the projection 125 moves beyond the flat surface of the stud 126, the control plate 127 is spring returned a slight distance upwardly to cause said stud 126, in cooperation with said projection 125, to retain the amount key depressed. The operation of the amount keys is flexible in that depression of an amount key releases a previously depressed amount key in the same row.

Downward movement of the plate 127 and incidental counterclockwise rocking of the arm 129 causes a camming surface on said arm, in cooperation with a roller, to rock a zero stop pawl 130, rotatably mounted in the frame 122, counterclockwise out of the path of a nose 131 of a reset spider 132 for a differential actuator 133. The actuator 133 is rotatably mounted on a hub 134 extending between two plates 135, only one here shown, supported by rods 136 and 137 extending between the frames 50 and 51. Depressing one of the amount keys 121 (Fig. 2) moves the lower end of the stem thereof into the path of a latch arm 138 which is pivotally connected to the actuator 133 and together with a companion arm 139 shiftably supports a differential latch 140. When the actuator 133 is in home position as here shown, a foot-shaped rearward extension of the latch 140 is spring-urged into communication with a shoulder 141 of a differential operating segment 142 pivoted on the hub 134 and connected by a link 143 to an A-shaped lever 144 pivoted on a stud 145 secured in the plate 135. Downward extensions of the lever 144 carry rollers 147 and 148 which cooperate respectively with companion plate cams 149 and 150 secured to the main drive shaft 74.

It will be recalled that in adding operations the main shaft 74 makes one clockwise revolution which, by means of the cams 149 and 150, see space 1 of chart Fig. 39, rocks the lever 144 and the driving segment 142 first clockwise and then back to normal position. Due to the shoulder 141, the segment 142 carries the latch 140 and the actuator 133 clockwise in unison therewith until the latch arm 138 contacts the stem of the depressed key. This shifts the latch 140 forwardly to disengage the foot-shaped rearward projection thereof from the shoulder 141 and to engage a nose 151 thereof with one of a series of arcuate notches 152 in a curved alining plate 153 secured to extending arms of the plate 135. The segment 142 completes its initial movement clockwise independently of the latch 140, and an arcuate surface of said segment, in cooperation with the foot-shaped extension of the latch 140, locks said latch and the actuator 133 in set position.

After the actuator 133 has thus been positioned commensurate with the value of the depressed amount key, the corresponding wheel of the selected totalizer or selected totalizers are engaged therewith under the influence of the transaction keys and the clerks keys. When the lever 144 (Fig. 2) nears the terminus of its initial movement clockwise, a roller 154 carried thereby engages the arcuate surface of a beam 155 pivoted to the actuator 133, and forces a curved recess in the upper surface of said beam into contact with a hub 156 for the actuator 133. This positions the beam 155 commensurate with the depressed amount key and said differential positioning is transmitted by means of a link 160 to an indicator 157 (Fig. 1) and a plurality of type carriers for that particular bank. The upper end of the link 160 is connected to an indicator segment 161, rotatably supported by an indicator shaft 162 journaled in the frames 50 and 51, and the lower end of said link 160 is pivotally connected to an arm 163 connected to one of a series of nested tubes 164 rotatably mounted on a printer shaft 165 journaled in the frames 50 and 51. Secured to the other end of the tube 164 is a corresponding printer operating segment 166 (Fig. 12) which is in turn geared to the type carrier for that particular denomination.

Figure 2:
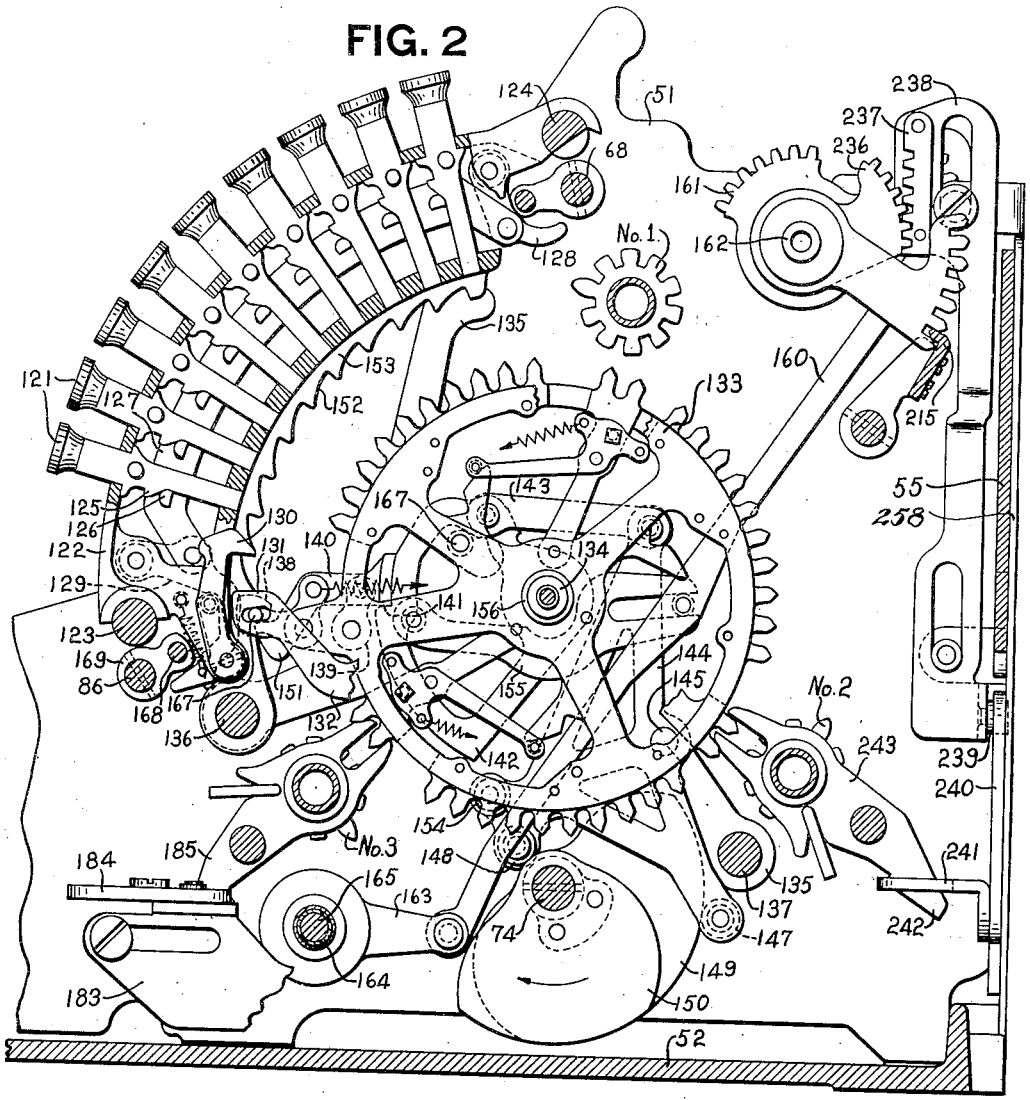
Fig. 2 is a cross-sectional side elevation of the machine taken just to the right of one of the amount banks.

It is by means of the above described mechanism that the differential positioning of the actuator 133 and the beam 155 is transmitted to the indicator and type carriers for the particular amount bank illustrated in Fig. 2. The reset spider 132 (Fig. 2) is slotted to embrace a stud 167 secured in the latch 140. When no amount key is depressed, the zero stop pawl 130 engages the nose 131 of the reset spider to break the latch 140 in zero position.

In total recording operations the shaft 74 makes two revolutions or two cycles of movement as explained herein before and consequently the segment 142 makes two complete excursions. The first cycle of a total recording operation is utilized to aline the wheels of the selected totalizer with the differentials and during this cycle the zero stop pawls 130 (Fig. 2) break all the amount latches in zero position. Near the end of the first cycle, the cam 113 (Fig. 9) shifts the link 81 forwardly to rock the lever 82 and the shaft 86 clockwise. Clockwise movement of the shaft 86 causes a rod 168, supported by arms 169 secured to said shaft 86, to engage forward extensions of the zero stop pawls 130 and rock said pawls counterclockwise to ineffective position. Immediately thereafter, the wheels of the selected totalizer are engaged with the actuators 133 and clockwise movement of said actuators reversely rotates said totalizer wheels until a long tooth thereon, in cooperation with mechanism, not shown but well known in the art, stops the totalizer wheels at zero and positions the actuators 133, the indicator mechanism and the type carriers commensurate with the amount on said totalizer wheels.

In resetting operations, the totalizer is disengaged from the actuators 133 before said actuators are returned counterclockwise and consequently said wheels remain at zero. In reading operations, the totalizer wheels remain engaged with the actuators during their return movement and are consequently returned to their original positions. The manually positioned total control plate 95 (Fig. 7) controls the selecting and the engaging of the of the different totalizer lines with the actuators in total recording operations.

*Transaction keys*

Figure 3:
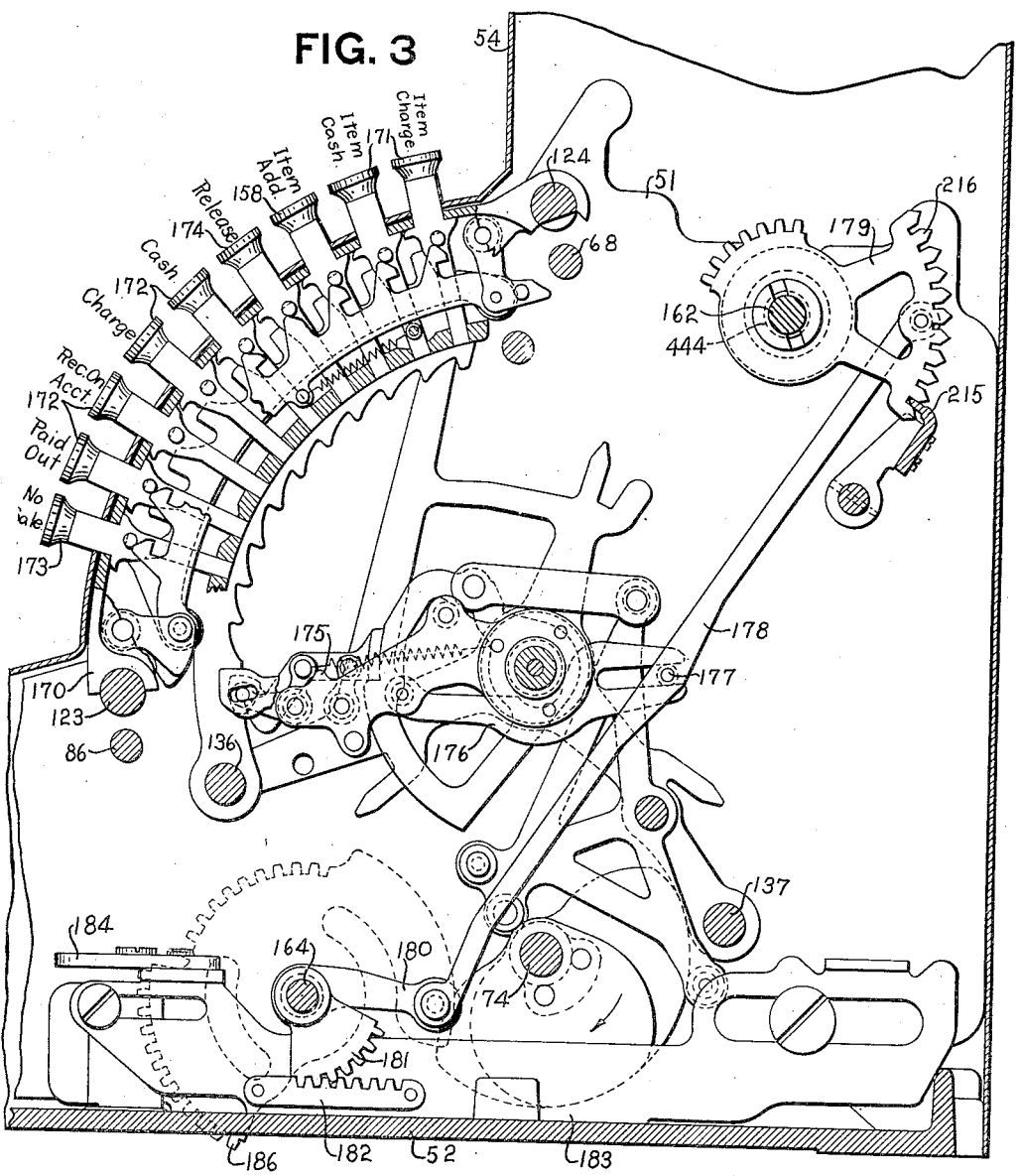
Fig. 3 is a cross-sectional view of the machine taken just to the right of the transaction bank.

The machine embodying this invention has three lines of totalizers, namely, a #1 or multiple item line, a #2 or clerk's line, and a #3 or transaction line. The #1 line has one set of wheels and is used in multiple-item operations to accumulate the total amount of a plurality of items. The #2 line has five sets of wheels selected by means of a row of clerks' keys 189 (Fig. 10) to accumulate totals of Cash and Received-on-account transactions. The #3 line has four sets of wheels, selected by means of a bank 170 of transaction keys (Fig. 3). The keys of the transaction bank are divided into two groups. One of said groups consists of three multiple item keys, namely, an "Item charge" key 171, an "Item cash" key 171 and an "Item add" key 158. The "Item add" key 158 does not select a set of wheels on the No. 3 line but is, as its name implies, merely an adding key and enters amounts into the single set of wheels on the No. 1 line as will be more fully explained later. The other group of transaction keys consists of four single item keys 172, namely, "Cash," "Charge," "Received-on-account" and "Paid-out." The bank of transaction keys also includes a "No-sale" key 173, which is merely a printing and indicating key, and a Release key 174 for releasing any depressed transaction key.

Depressing one of the transaction keys 171 or 172 moves the lower end of the stem thereof into the path of a differential device 175, similar in every respect to the amount differential explained above, and upon operation of the machine, see space 2 of chart Fig. 39, the depressed transaction key breaks the latch of the differential device 175 in a position corresponding to said key. The differential device has a beam 176 which is positioned commensurate therewith, and which is bifurcated to receive a stud 177 in a link 178, the upper end of which is connected to an indicator segment 179 loose on the shaft 162 and the lower end of said link is pivotally connected to an arm 180, secured to a segment 181 loose on the shaft 164. The segment 181 meshes with a rack 182 secured to a slide 183 mounted for horizontal sliding movement on upwardly extending portions of the base 52. The slide 183 (Fig. 2) imparts transverse sliding movement to a slide 184, which, in cooperation with an arm 185 of the #3 totalizer line, shifts said totalizer line laterally to aline the wheels thereof corresponding to the depressed transaction keys 171 or 172 with the amount differentials 133. It is therefore evident that the pitman 176 and the link 178 and connected mechanisms position a transaction indicator 213 (Fig. 1) and select the set of totalizer wheels on the No. 3 line corresponding to the depressed transaction key. An indicator aliner 215 (Figs. 2 and 3), in cooperation with alining teeth 216 in the segment 179 and similar teeth in the segments 161 for the amount banks and a similar segment for the clerks bank, retain said segments and their associated mechanism in set positions during machine operation.

The three multiple item keys 171 and 158 (Fig. 3) select the single totalizer on the #1 line to accumulate the total amount of items, and in addition the "Item charge" and "Item cash" keys respectively select the same totalizers on the #3 line as the Cash and Charge keys 172. The arm 180 is connected to a printer segment 186 which is in turn connected to a transaction type carrier and positions said carrier commensurate with the depressed transaction key.

*Clerks' keys and differential mechanism therefor*

As previously stated, the machine of this invention has five clerks' keys 189 (Fig. 10) mounted in a frame 187 supported by the rod 124 and a stud 188 extending between the left frame 51 and the printer frame 72. The keys 189 upon depression are operable to control the selection of corresponding sets of totalizer wheels on the #2 totalizer line. The lower end of the stems of the keys 189 are adapted to cooperate with a projection 190 of a differential lever 191 loose on a stud 192 secured in the frame 51. A link 193 (Figs. 10 and 33) connects the lever 191 to a differential latch lever 194 turnably mounted on the indicator shaft 162. The arm 194 (Figs. 10 and 35) has fast therein a stud 195 which engages an upward extension of a latch 196 pivotally connected to a latch plate 197 rotatably mounted on the indicator shaft 162. A spring 198 stretched between an extension of the plate 197 and the stud 195 urges the latch 196 counterclockwise to normally maintain a tooth 199 thereon out of engagement with V-shaped alining notches 200 in a curved alining plate 201 secured to the left frame 51. Pivoted to the plate 197 is a clerk's differential beam 202 slotted to receive a stud 203 secured in an arm 204 secured on the shaft 162. A link 205, the upper end of which is fulcrumed on the stud 203, pivotally connects the arm 204 and the beam 202 to a clerk's printer segment 206 rotatable on the stud 192. A link 207 (Figs. 10 and 12) connects the segment 206 to a segment 208 loose on a stud 209 extending between the frames 51 and 72. Teeth in the segment 208 mesh with a gear 210 connected by one of a series of nested tubes 214 (Figs. 6 and 27) to a gear 212 which drives a type wheel 211 corresponding to the clerk's keys, said type wheel being mounted in the front detail printer. Other teeth on the segment 208 mesh with a partial gear 217 connected to a corresponding clerk's type wheel in the receipt printer, not shown.

Figure 35:
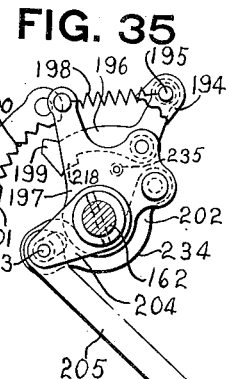
Fig. 35 is a detail of the clerks differential latch and associated mechanism.

Directing attention to Figs. 10, 11 and 35, the latch 196 has a projection 218, which cooperates with a step 219 in the periphery of an arm 220 loose on the shaft 162. The arm 220 has integral therewith a crank 221 connected by a link 222 to a cam lever 223 fulcrumed on a stud 224 secured in the frame 51. The lever 223 carries a roller 225 which cooperates with a cam groove 226 in a box cam 227 (see also Figs. 5 and 21) secured on a short shaft 228 journaled in the frames 51 and 72. Also secured on the shaft 228 is a gear 229 which meshes with a gear 230 rotatably mounted on a shaft 231, opposite ends of which are journaled in the frame 51 and a printer front frame 232. The gear 230 meshes with the gear 71, which as previously stated, is connected by the train of gears shown in Fig. 5 to the driving motor.

Depressing one of the clerk's keys 189 (Fig. 10)

moves the lower end thereof into the path of the projection 190. The cam 227 makes one clockwise revolution, see space 3 of chart Fig. 39, in adding operations to rock the cam lever 223 and the latch arm 229 (Fig. 11) first counterclockwise and then back to normal position. The spring 198 normally maintains the projection 218 of the latch 196 in engagement with the step 219 and consequently said latch 196, the plate 197, the beam 202 (see also Fig. 35) and the lever 194 move in unison with said latch arm 229 during its initial movement counterclockwise. Counterclockwise movement of the lever 194 by means of the link 193 causes the lever 191 (Fig. 33) to move in unison therewith until the projection 190 engages the stem of the depressed clerk's key. This obstructs further counterclockwise movement of the lever 194 and the plate 197 and locates them in a position corresponding to the depressed clerk's key. The latch arm 229 (Figs. 10 and 11) continues its counterclockwise movement and the step 219 forces the latch 196 upwardly to engage the tooth 199 with one of the notches 200. An arcuate portion of the periphery of the arm 229 passes under the projection 218 to lock said latch and connected mechanism in set positions. As the lever 223 nears the terminus of its initial movement counterclockwise, a roller 233 connected to an upward extension thereof engages an arcuate outer surface 234 of the beam 202 and forces a curved inner surface of said beam into contact with a stop collar mounted on the shaft 162.

Differential positioning of the beam 202 (Figs. 10 and 35) by means of the link 205, the segment 206, the link 207 and the gearing shown in Fig. 12, sets the clerk's type wheel 211 to a position corresponding to the depressed clerk's key. The arm 204 (Fig. 35) being secured on the shaft 162 positions said shaft commensurate with the depressed clerk's key and, by means of an indicator segment similar to the amount segment 161, shown in Fig. 2, sets up the clerk's indicator corresponding to the depressed clerk's key. The shaft 162 also shifts the #2 or clerk's totalizer assembly laterally to align the selected set of totalizer wheels with the amount differentials 133 and this lateral shifting is accomplished in the following manner:

Secured on the shaft 162 (Fig. 2) is a gear sector 236 which meshes with a rack 237 secured to a slide 238 mounted to shift vertically on the machine back plate 55 and a plate 258 secured to said back plate 55. The slide 238 carries a roller 239 which cooperates with an angular slot in another slide 240 mounted for horizontal sliding movement on the plate 258. The slide 240 has an extending bracket 241 bifurcated to receive an extension 242 of an arm 243 which is an integral part of the #2 totalizer assembly. The positioning of the shaft 162 under influence of the clerk's differential mechanism, by means of the instrumentalities just described, shifts the #2 totalizer assembly laterally to aline the set of clerks' totalizer wheels corresponding to the depressed clerk's key with the differential actuators 133. When no clerk's key is depressed in an operation, the clerk's differential mechanism is stopped in a neutral position by means of a surface 244 (Fig. 10) of the lever 191 engaging a stationary stud 245 in the frame 72.

When the step 219 (Figs. 10 and 11) moves beyond the projection 218, during return movement clockwise of the arm 229, the spring 198 disengages the latch 196 from the plate 200 and reengages the projection 218 with the recess formed by said step 219. Simultaneously, a right-hand projection of the arm 229 engages a stud 235 in the plate 197, see also Fig. 35, and returns said plate 197 and connected mechanism to starting position. It will be noted that the beam 229 and connected mechanism remain in their set positions until the succeeding operation and are moved directly therefrom to their new positions.

In total recording operations, the cam 227 (Fig. 10) makes two clockwise revolutions and consequently the differential mechanism for the clerks' bank makes two excursions of movement. The setting of the type wheels, the indicator mechanism and the selection of the totalizers is effected during the first excursion of movement and the second excursion of movement is but an idle operation of the differential mechanism. There are various interlocks between the machine releasing mechanism, the totalizer control lever, the transaction keys, the amount keys and the clerks' keys to enforce the proper operation of the machine.

*Printer mechanism*

Figure 4:
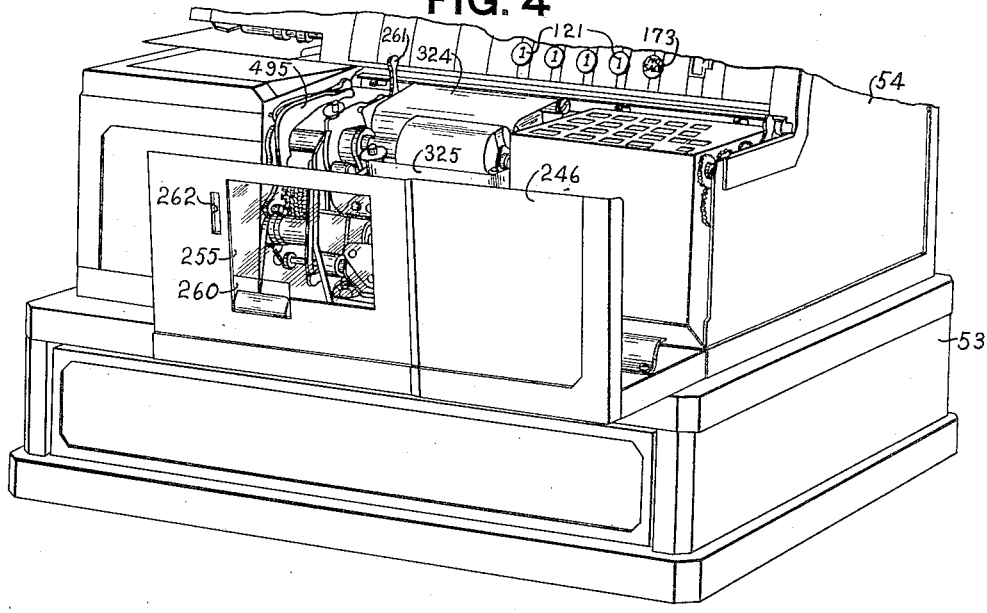
Fig. 4 is a fragmentary perspective of the lower portion of the machine showing the closure, that encloses the front printing mechanism, in open position.
Figure 7:
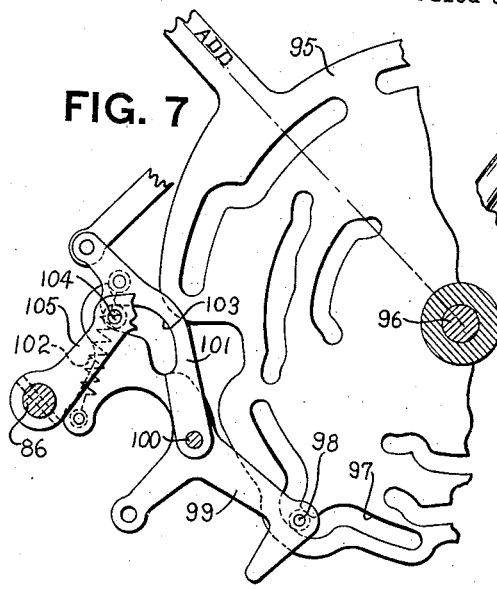
Fig. 7 is a fragmentary detail view of the total control plate and part of the mechanism associated therewith.

The machine embodying the instant invention is provided with a detail printing device conveniently located at the front of the machine and enclosed by a closure 246 (Figs. 1 and 4) which forms a part of the cabinet 54. The closure 246 is provided with a lock 247 (Figs. 28 and 29) to prevent unauthorized persons from having access to the printer in general and particularly to the detail record strip. The lock 247 for the closure 246 is assembled on a frame 248, supported by the rods 123 and 124 (Fig. 2) and provided with a guide slot for the fingerpiece extension of the total control plate 95 (Fig. 7). The slot in the frame 248 has various notches therein corresponding to the different positions of the total control plate 95 and affords a means of locating and retaining said plate in its different positions. Unlocking the lock 247 (Fig. 29) imparts counterclockwise movement to a lever 249 pivotally mounted on said lock and bifurcated to embrace a stud in the upper end of a lever 250, pivotally mounted on the frame 248. Counterclockwise movement of the lever 249 imparts clockwise movement to the lever 250, which movement, by means of a stud in the lower end of said lever in cooperation with a substantially vertical slot 251 in a locking bar 252, mounted for transverse shifting movement on the machine framework by means of slots therein, in cooperation with screw studs, shifts said locking bar toward the left as viewed in Fig. 28. Left-hand shifting movement of the bar 252 disengages a plurality of hooks 253, only one here shown in Fig. 28, from a plurality of corresponding locking brackets 254 secured to the closure 246. After being unlocked, the closure 246 may be opened, as shown in Fig. 4, thus giving access to the detail printing device for various obvious purposes, for example, changing the record material or inking ribbon and resetting the consecutive number type wheels, etc. Locking the closure 246 is but a reversal of the procedure outlined above.

The closure 246 (Figs. 1 and 4) is provided with an opening 255, covered with a transparent substance through which a liberal portion of the detail strip and the latest entries thereon are visible. An aperture 260 in the closure 246 provides a means to permit autographing desired data on the detail strip. A finger lever 261 protrudes through an opening 262 in the closure 246 when said closure is shut and provides a means for hand-feeding the detail strip.

The detail printing device has a plurality of amount type wheels 263 (Figs. 6 and 31) positioned by the amount differentials 133, a clerk's type wheel 211 positioned in the manner explained earlier herein, a transaction type wheel 264 positioned by the transaction bank, and a read and reset type wheel 265, positioned by the total control lever 95. There is also a plurality of consecutive number type wheels 266, which record the number of transactions, and a series of machine or department number type wheels 267, which may be set by hand to any desired number. The detail printer type wheels are rotatably supported on a shaft 268, journaled in the frames 72 and 51, and in a detail printer frame 269, attached to the base 52 and connected by a crossbar 270 to the frame 51.

The amount type wheels 263 mesh with corresponding drive gears 271 (Figs. 6 and 27) connected by the telescoped tubes 214 to a plurality of gears 272. The tubes 214 are rotatably supported on a shaft 274 journaled in the frames 51, 72 and 269. The gears 272 are connected by a plurality of segments 275 (Fig. 12) to the amount segments 166, which it will be recalled are connected by nested tubes 164 to the amount differential mechanisms. The transaction type wheel 264 (Figs. 6, 27 and 31) meshes with a drive gear 276 connected by one of the nested tubes 214 to a similar gear 277, which is connected by segments similar to the segments 275 and 166 to the transaction differential mechanism. The X and Z type wheels 265 meshes with a drive gear 278, secured to the shaft 274. Also secured on the shaft 274 is a gear 279, which, by means of segments similar to those shown in Fig. 12, is connected to the total control plate 95.

Type wheel aliner mechanism

Figure 38:
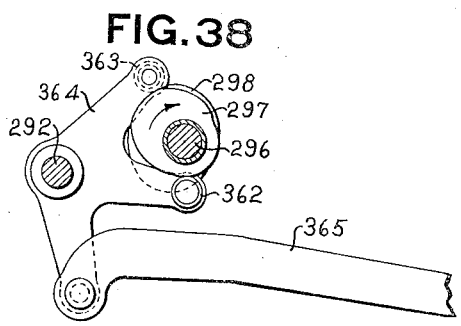
Fig. 38 is a detail view of the cams and associated lever for operating the paper feed.

After the type wheels have been positioned by their respective differential mechanisms, they are alined and retained in position by means of an aliner 280 (Figs. 6 and 27) which cooperates with the teeth of the gears 271, 276, 212 and 278. The aliner 280 extends between similar arms secured to a shaft 281 journaled in the frames 51, 72 and 269. A downward extension 282 on one of the aliner arms has connected thereto one end of a spring 283 which is tensioned to urge the aliner 280 into communicatiton with the teeth of the type wheel drive gears. Also secured on the shaft 281 is an arm 284, a raised surface of which cooperates with a projection 285 of a latch 286 loose on a shaft 287 journaled in the frames 72 and 51. A spring 288 urges the latch 286 counterclockwise to normally maintain a downward extension of said latch in contact with a stud 289 carried by a pitman 290, the forward end of which is slotted to embrace a collar on the shaft 287 and the rearward end of which is pivotally connected to a cam lever 291 (Fig. 13) loose on a shaft 292 journaled in the frames 72, 51 and 269. Y-shaped extensions of the lever 291 carry rollers 293 which cooperate respectively with the peripheries of companion plate cams 294 and 295. The cams 294 and 295, together with companion plate cams 297 and 298 (Figs. 5 and 38), which drive the detail strip feed, a clutch disc 299 and an aliner disc 306 (Figs. 15 and 16) are secured in an integral cluster on a hub 307 loose on a shaft 296 journaled in the frames 51, 72 and 269. A raised segmental portion of the disc 299 forms an abutment adapted to cooperate with clutch pawls 300 and 301 pivotally supported on a clutch plate 302 secured to the shaft 296. The manner in which the clutch mechanism, described above, functions will be explained later herein under the subheading "Control of impression mechanism."

Secured on the shaft 296 (Figs. 5 and 21) is a gear 303 which meshes with a similar gear 304, secured on the shaft 231 and having integral therewith a clutch disc 305, a raised segmental portion of which cooperates with clutch pawls 310 and 311 pivotally mounted on a plate 312 integral with the gear 230, which it will be recalled is rotatably supported by the shaft 231. A spring 313 stretched between the pawls 310 and 311 urges said pawls into communication with the segmental portion of the clutch disc 305.

Figure 5:
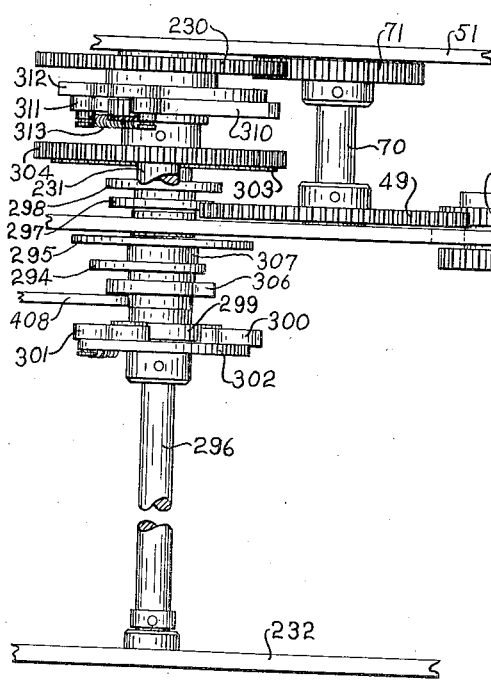
Fig. 5 is a plan view of the operating shaft and associated mechanism for the front printing mechanism.
Figure 6:
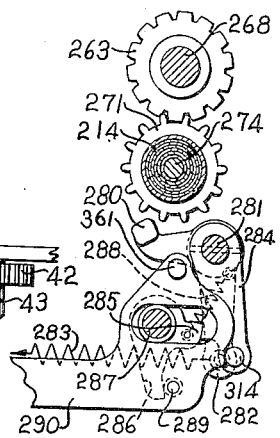
Fig. 6 shows in detail a portion of the alining mechanism for the type wheels.

In a total recording operation, mechanism, later to be described, disengages the pawl 310 from the disc 305 to uncouple the gear 304 and the shaft 231 from the gear 230 during the first cycle of a total recording operation to prevent the detail printing mechanism from making an unnecessary operation. In adding operations, the gear 304 remains clutched to the gear 230 as here shown (Fig. 21) and consequently moves in unison therewith one counterclockwise revolution to drive the gear 303 and the shaft 296 one clockwise revolution. Clockwise movement of the shaft 296, (Fig. 16) when the pawls 301 and 300 are engaged with the disc 299, causes the companion cams 294 and 295 (Figs. 5, 6 and 13) to rotate clockwise in unison therewith to rock the lever 291 first clockwise and then back to normal position, see space 3 of chart Fig. 39. Initial movement clockwise of the lever 291 shifts the pitman 290 rearwardly, which by means of the stud 289 imparts clockwise movement to the latch 286 to disengage the projection 285 thereof from the raised surface of the arm 284. This permits the spring 283 to engage the aliner 280 with the teeth of the drive gears 271, 276, 212 and 278 (Figs. 6 and 27) to aline the type wheels in their set positions. Return movement forwardly of the pitman 290, in cooperation with a stud 314 of the arm 284, restores said arm counterclockwise to disengage the aliner 280 from the teeth of the type wheel drive gears. After the arm 284 has been fully restored, the spring 288 returns the latch 286 counterclockwise to effective position, as shown in Fig. 6, to block clockwise alining movement of the aliner 280 until the type wheels have been positioned.

Printer disabling mechanism

Shifting the total control control lever 95 (Fig. 7 and space 2, Fig. 40) away from adding position rocks the zero stop throwout shaft 86 a slight distance clockwise as viewed in Fig. 7, and counterclockwise as viewed in Fig. 21, in the manner previously explained. An arm 315 secured on said shaft 86 moves in unison therewith causing a camming slot 316 therein in cooperation with a stud 317, in an arm 318 pivoted to the frame 51, to rock said arm 318 clockwise. A link 319 pivotally connects the arm 318 to a clutch disabling pawl 320 pivoted on a stud 321 in the frame 51, thus clockwise movement of the arm 318 (Fig. 21) is transmitted to the pawl 320 to move the lower end of said pawl in the path of an extension of the clutch pawl 310. Therefore, initial movement counterclockwise of the gear 230 and the plate 312 (see space 1, Fig. 40) causes the pawl 310 to engage the end of the pawl 320 and to be rocked thereby out of engagement with the segmental portion of the clutch disc 305. This disconnects the gear 304 from the gear 230 and consequently said gear 304, the gear 303 and the shaft 296 remain stationary during the first cycle of a total recording operation. This causes the companion plate cams 294 and 295 (Fig. 13) which are connected by the clutch mechanism shown in Fig. 16, to the shaft 296, to also remain stationary to prevent the aliner mechanism from making an unnecessary excursion of movement during the first cycle of a total recording operation.

Near the end of the first cycle of a total recording operation, additional counterclockwise movement is imparted to the shaft 86, as viewed in Fig. 21, by the mechanism shown in Fig. 9, and explained herein before. Configuration of the camming slot 316 is such that this added movement of the arm 315 shifts the pawl 320 counterclockwise to ineffective position. This permits the pawl 310 to reengage the disc 305 to rotate the gear 304, the gear 303, the shaft 296 and the cams 294 and 295 (Figs. 6 and 13) one revolution during the second cycle of a total recording operation, to operate the type wheel aliner mechanism.

*Impression mechanism*

Figure 34:
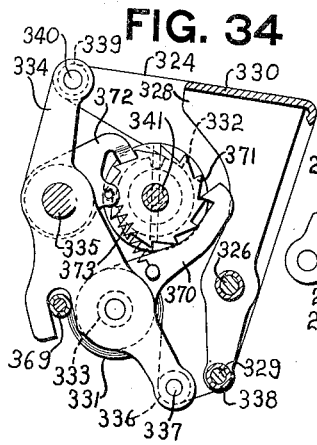
Fig. 34 is a left end detail view of the paper feeding mechanism.

The impression mechanism of the instant machine is of the squeeze type and includes an impression hammer 322 (Fig. 36) with a platen block 323 adapted to carry the web of a detail strip 324 (Figs. 20, 31 and 34) and its associated inking ribbon 325 into contact with the type wheels, to make a record of the transaction being performed. The hammer 322 is rotatably mounted on a sleeve 326 extending between a main detail roll support plate 327 (Figs. 34 and 36) and an auxiliary plate 328. The auxiliary frame 328 is further connected to the main frame 327 by a rod 329 extending between said frames and by a right angled extension 330 of said frame 328, which also forms a table over which the detail strip 324 passes and by means of which desired data may be autographed upon the detail strip 324 through the aperture 260 (Fig. 4) in the closure 246.

The detail record strip 324 (Figs. 27 and 34) is unwound from a supply roll 331 and onto a receiving reel 332. The supply roll 331 is loosely supported on a stud 333 secured in a detail strip tension lever 334, fulcrumed on a trunnion 335, journaled in a bushing 357 fast in the plate 327 (see also Fig. 36). The web of the detail strip 324 is threaded from the supply roll 331 around a roller 336 mounted on a stud 337 secured in the lever 334, thence around an anti-friction roller 338 supported by the rod 329. The detail strip is guided from the roller 338 around the rounded forward edge of the table 330 over the top of said table, thence around a roller 339 rotatably supported by a stud 340 secured in the upper end of the lever 334 and onto the receiving roll 332. The detail strip receiving reel 332 (Figs. 34 and 37) is rotatably supported by a stud 341 secured in the frame 327. The frame 327 is fulcrumed on a stud 342 secured in the frame 51 and with the auxiliary frame 328 forms a rockable unit adapted to be rocked from a working position, shown in full lines in Fig. 37, to a nonworking or loading position, shown in dot and dash lines. A projection 343 of the plate 327 in cooperation with the cross bar 270 provides a means of locating said plate 327 in loading position.

The frame 327 is latched in working position by means of the hook-shaped lower end 344 of the feed lever 261 in cooperation with a stationary stud 346 in the frame 51. The lever 261 is turnably mounted on a stud 345 secured in the plate 327 and the upper end of said lever forms a convenient fingerpiece by which the lever can be manipulated. A spring 347 urges the lever 261 counterclockwise, to maintain the hook-shaped lower end 344 thereof in engagement with the stud 346 and to cause said hook to ratchet over said stud when the plate 327 is returned to working position. The rockable frame formed by the plates 327 and 328 is further locked in working position by means of flattened disc 348 secured on a shaft 349 journaled in the sleeve 326 (Figs. 36 and 37) in cooperation with a circular recess in a slot 356 in the frame 269. Also secured on the shaft 349 is an arm 350 connected by a link 351 to the lever 261. When the frame 327 is in working position the disc 348 is locked in the circular portion of the slot 356 in the plate 269. Moving the lever 344 clockwise disengages the hook thereof from the stud 346 and by means of the link 351 rocks the shaft 349 and the disc 348 counterclockwise to aline the flat portion of said disc with the wall of the narrow portion of the slot 356 thus permitting the frame 327 to be swung outwardly to loading position.

The platen 323 (Fig. 36) of the hammer 322 is normally maintained out of contact with the type wheels by means of a spring 352 which urges said hammer counterclockwise, as here viewed, to normally maintain a projection 353, of an arm 354 secured to the left-hand arm of the hammer, in contact with a shoulder of the rod 329. A forward extension of the arm 354 cooperates with the nose of a crank 355 secured on the right-hand end of the shaft 287. Secured on the left-hand end of the shaft 287 is an arm 360, the upper end of which is slotted to embrace a stud 361 in the pitman 290, which, it will be recalled, operates the type wheel alining mechanism shown in Fig. 6.

Initial movement rearwardly of the pitman 290 (Figs. 6, 13, 36 and space 8, Fig. 39) causes the stud 361 in cooperation with the arm 360 and the shaft 287 to impart counterclockwise movement to the arm 355 to cause the nose thereof to engage the extension of the arm 354 to rock the hammer 322 clockwise to cause the platen 323 to impinge the detail strip 324 (Fig. 31) and the inking ribbon 325 against the type wheels to make an imprinted record of the transaction being performed. Return movement forwardly of the pitman 290 permits the spring 352 (Fig. 36) to return the hammer 322 counterclockwise to its position of rest as here shown.

It will be recalled that the mechanism shown in Fig. 21 renders the pitman 290 inoperative during the first cycle of total recording operations. Consequently the hammer 322 will remain idle during the first cycle of total recording operations and will make one imprinting stroke during the second cycle of said total recording operations.

*Detail strip feed*

Mechanism operated by the cams 297 and 298 (Fig. 38) advances the detail strip 324 during machine operations to present a new portion thereof to the impression mechanism. The cams 297 and 298, which, it will be recalled, are integral with the cams 294 and 295 (Fig. 6) the clutch disc 299 and the aliner disc 306 (Figs. 5 and 16), have cooperating with their peripheries respectively rollers 362 and 363 (Fig. 37) on the arms of a Y-shaped cam lever 364 loose on the shaft 292. Lever 364 is connected by a link 365 to an arm 366 secured on a short shaft 367, opposite ends of which are journaled in the frames 51 and 269. An arm 368 is also secured on the shaft 367 and carries a roller 369 which cooperates with a slot in the paper feed and tension lever 334 (see also Fig. 34) which, it will be recalled, is fulcrumed at 335 to the plate 327. The lever 334 carries a detail strip feed pawl 370, pivoted on the stud 333, which stud forms a pivot for the detail strip supply roll 331. The upper end of the feed pawl 370 forms a tooth adapted to cooperate with the teeth of a detail strip feed ratchet 371 secured to the receiving reel 332. A ratchet retaining pawl 372 is fulcrumed on the trunnion 335 and cooperates with the teeth of the ratchet 371 to prevent retrograde movement of the reel 332. A spring 373 tensioned between the pawls 370 and 372 urges said pawls into communication with the teeth of the ratchet 371.

Figure 36:
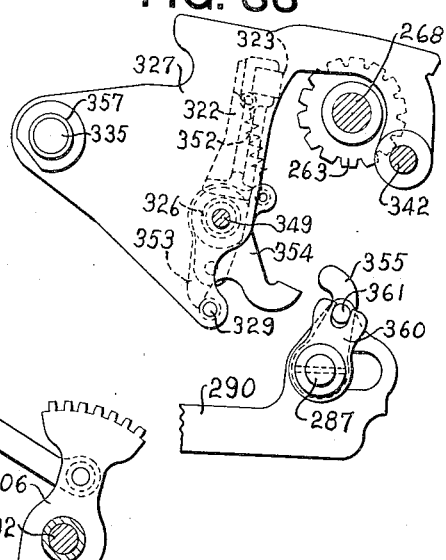
Fig. 36 is a detail of the hammer operating mechanism.
Figure 37:
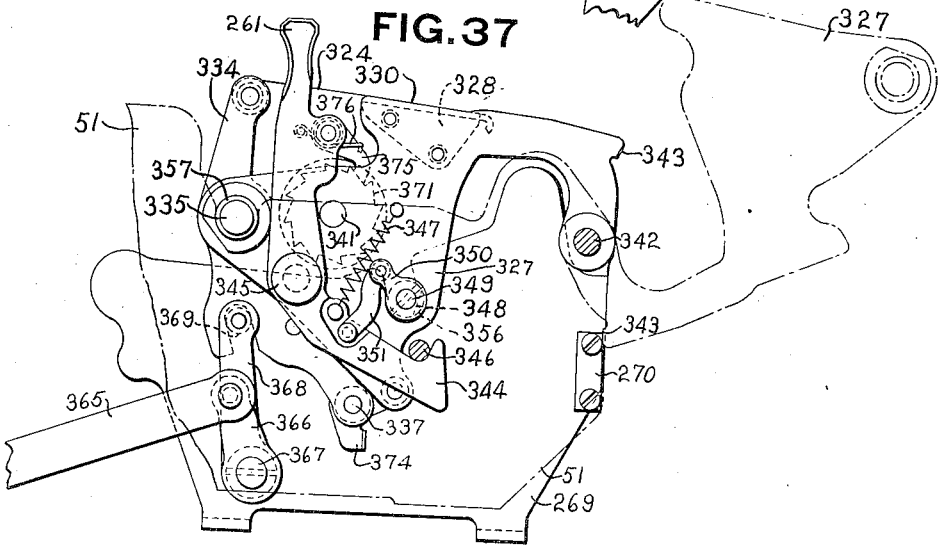
Fig. 37 is a left end view of the hinged frame that supports the paper feeding mechanism and shows, among other things, part of the operating mechanism for the paper feed.

In adding and total recording operations the cams 297 and 298 (Fig. 38) make one clockwise revolution. This one revolution of movement is effected on total recording operations, which, it is understood, are two-cycle operations, by means of the mechanism shown in Fig. 21 and explained earlier herein. Clockwise rotation of the cams 297 and 298 (space 7, Fig. 39) oscillates the lever 364 first in a clockwise direction then back to normal position as here shown to shift the link 365 back and forth to rock the arms 366 and 368 (Fig. 37) first counterclockwise, then back to normal position. Initial movement counterclockwise of the arm 368 shifts the lever 334 clockwise on its pivot 335. Clockwise movement of the lever 334 shifts the web of the detail strip 324 to move the printing line thereof from its visible reading position on top of the table 330, to printing position, which is opposite the platen 323 of the impression hammer 322 (Fig. 36). Simultaneously with the shifting of the detail strip 324, the pawl 370 advances the reel 332 one step to present an unprinted portion of the strip 324 to the impression mechanism. The shifting and feeding of the detail strip as explained above is accomplished prior to the impression stroke of the hammer 322. Return movement counterclockwise of the lever 334 shifts the detail strip back to reading position and causes the feed pawl 370 to ratchet over a tooth of the ratchet 371, preparatory to subsequent feeding thereof. When the detail strip supporting frame, composed of the plates 327 and 328, is moved from working position to loading position, the slot in the lever 334 moves out of engagement with the roller 369 but said slot remains alined with said roller to facilitate reengagement thereof upon return of the plate 327 to working position.

A tension device 374 (Fig. 37) pivoted on the rod 337 engages the supply roll 331 to keep the detail strip taut at all times. The lever 261 (Fig. 37) which latches the plate 327 in working position, is also arranged to hand feed the detail strip 324. Clockwise unlatching movement of said lever causes a feed pawl 375 carried thereby, in cooperation with the teeth of the ratchet 371, to advance the receiving reel 332 one step to feed the detail strip. A torsion spring 376 urges the pawl 375 clockwise into communication with the teeth of the ratchet 371.

*Inking ribbon*

The mechanism that operates the detail strip feed also operates the inking ribbon feed. A reversible ribbon feeding device is employed in the present machine and the inking ribbon 325 (Figs. 27, 30, 31 and 32) is wound and unwound between similar spools 377 and 378. The spool 377 is positively driven by a reversible mechanism 379, said spool and said mechanism being supported by a bracket 380 secured to the frame 51. From the spool 377 the ribbon 325 is guided around a roller 381 supported by the bracket 380, thence between the detail strip 324 and the type wheels. The ribbon is then threaded round rollers 382 and 383 supported by a bracket 384 secured to the frame 269, thence a roller 385 secured to the cross bar 270 and finally wound onto the spool 378. The driving mechanism 379 for the spool 377 is operated by an arm 386 pivoted on a stud 387 in the bracket 380. The arm 386 carries a stud 388 which cooperates with a cam slot in a crank 389, (see also Fig. 25) connected to a sleeve 390 rotatably mounted within a hub 392 secured in the frame 51 and journaled upon a tube 393, which constitutes part of the consecutive number driving mechanism and said tube is turnably mounted upon the shaft 268. The crank 389 (Figs. 25 and 30) is pivotally connected by a link 394 to a bell crank 395 loose on the shaft 287 and loosely connected by a link 396 to an upwardly extending arm 397 secured on the paper feed shaft 367. Oscillation of the shaft 367 and the arm 397 by the cams 297 and 298 (space 7, Fig. 39) and the mechanism shown in Figs. 37 and 38, through the connections shown in Fig. 30, rocks the arm 386 back and forth to operate the feeding mechanism 379 for the spool 377.

Oscillating movement of the crank 389 (Figs. 30, 31 and 32) is transmitted by means of the sleeve 390 to an element 398 secured to a flange on the opposite end of said sleeve 390 in order to operate spool 378. The element 398 carries a feed pawl 399 urged by a torsion spring 400 into communication with the teeth of a ratchet wheel 401 pivoted to the frame 270, and with an upwardly extending spindle 402 which loosely supports the spool 378. The lower flange of the spool 378 is resiliently urged into frictional engagement with the face of the ratchet 401. Rocking movement of the element 398 causes the pawl 399 to rotate the ratchet 401 step by step in a clockwise direction, as viewed in Fig. 31, and the ratchet 401 tends to carry the spool 378 clockwise in unison therewith until the frictional engagement there between is overcome. A retaining pawl 406 (Fig. 27), cooperating with the teeth of the ratchet 401 prevents retrograde movement of said ratchet. When the reversible mechanism 379 is winding the inking ribbon 325 onto the spool 377 the frictional drive of the spool 378 is overcome thereby. When all the ribbon is unwound from the spool 378 the increased tension of the ribbon causes the drive of the spool 377 to be reversed to unwind the ribbon therefrom. This permits the ratchet wheel 401 to rotate the spool 378 in a clockwise direction to take up the ribbon unwound from the spool 377.

*Control of impression mechanism*

In reviewing briefly, it will be recalled that the transaction keys 158 and 171 (Fig. 3) control the machine during multiple item operations.

Likewise it will be recalled that the keys 171 select corresponding totalizers on the #3 or transaction, line, for engagement with the actuators 133 and simultaneously select the #1, or multiple item, totalizer, for engagement with said actuators. The "item add" key 158 also selects the #1 totalizer but has no corresponding totalizer on the #3 line. In order to enforce clearing of the #1, or multiple item, totalizer at the end of each multiple item operation, the keys 158 and 171 are stay-down keys and remain depressed until the #1 totalizer is cleared. It is therefore obvious that after each series of multiple item operations, it is necessary to reset the #1 totalizer before any other type of operation can be performed. During the adding of multiple items, mechanism is automatically rendered effective to disable the impression mechanism, including the type wheel aliner, the printing hammer, the detail strip feed and the inking ribbon. However, during the resetting of the multiple item totalizer the impression mechanism is rendered effective to print the result of the multiple item transaction. This mechanism for automatically controlling the impression means is under the control of a manipulative member which is settable to two positions. When the manipulative member is in one position, the automatic mechanism that disables the impression means is rendered ineffective and consequently the impression means functions at all times. When the manipulative member is in its other position, the control of the impression mechanism is surrendered to the automatic means. The impression controlling mechanism will now be described in detail.

It will be remembered that the cams 294 and 295 (Figs. 5 and 13) and the cams 297 and 298 (Fig. 38) are assembled in an integral cluster with the clutch disc 299 (Fig. 16) and that a raised segmental portion of said clutch disc is adapted to cooperate with the pawls 300 and 301 carried by the clutch plate 302 secured on the shaft 296. The pawl 300 has a foot 402 adapted to cooperate with a projection 403 of a crank 404 loose on the shaft 292 and carrying a stud 405 adapted to cooperate with a camming slot in a lever 410 loose on a shaft 411 journaled in the frames 51, 72 and 232 (see also Fig. 5). The arm 410 carries a stud 412 (Figs. 13, 14 and 16) adapted to cooperate with a triangular opening 413 in an arm 414 secured on the shaft 292. Also secured on the shaft 292 is a crank 415 connected by a link 416 to a hand lever 417 rotatably mounted on the zero stop throwout shaft 86. The upper end of the lever 417 terminates in a convenient fingerpiece for manipulation thereof while a lower extension of said lever has two V-shaped notches therein, corresponding to the two positions of said lever, which notches are adapted to cooperate with the end of a retaining pawl 418 fulcrumed on a stud 419 in the frame 51 and urged clockwise by a spring 420 into communication with said V-shaped notches.

The lever 410 is adapted to be shifted clockwise from the position here shown and in a manner presently to be described, to cause the camming slot therein in cooperation with the stud 405 to shift the arm 404 counterclockwise to move the projection 403 thereof into the path of the foot 402 to disengage the impression operating cams from their driving disc 302. When the lever 417 is in its upper position as here shown, the triangular opening 413 in the arm 414, in cooperation with the stud 412, urges and retains the arm 410 in counterclockwise position, as here shown, to retain the projection 403 of the arm 404 out of the path of the foot 402 and thereby rendering the detail strip printing mechanism effective at all times. Shifting the lever 417 clockwise to its downward position imparts counterclockwise movement to the arm 414 to move the enlarged portion of the opening 413 opposite the stud 412 to surrender control of the arm 410 to the automatic controlling mechanism.

Directing attention to Figs. 16 and 18, a spring 422 is tensioned between the arm 410 and an arm 421 secured on the shaft 411, to urge the stud 412 into contact with the downward extension of said arm 421. Also secured on the shaft 411 is a crank 423 connected by a link 424 to one arm of a lever 425 loose on a shaft 426 journaled in the frames 72 and 232 (Fig. 5). An upper arm of the lever 425 is bifurcated to receive a stud 427 in an arm 428 secured to a shaft 429 journaled in the frames 51 and 72. Also secured on the shaft 429 (Figs. 16 and 17) is an arm 430 with an offset slot 431. The shaft 429 rotatably supports a yoke 432, an arm 433 of which has a slot 434. A roller 435 mounted on the upper end of a link 436 extends through the slots 431 and 434 to operatively connect the arm 430 to the yoke 432. The lower end of the link 436 is pivoted to an arm 437 loose on a stud 438 in the frame 51 and having an extension which is urged into engagement with an abutment 439 by a spring 440. An arm 441 of the yoke 432 carries a roller 442 adapted to cooperate with the periphery of a plate cam 443 journaled on the shaft 162 and connected by a tube 444 (Fig. 3) to the indicator segment 178 for the transaction bank 170. The arm 437 (Fig. 16) has connected thereto one end of a link 445, the other end of which is slotted to receive a stud 446 in a crank 447 secured to the zero stop throwout shaft 86.

It is therefore obvious from the foregoing description that the transaction differential mechanism 175 (Fig. 3) positions the impression control cam 443 (Fig. 16) commensurate with the depressed transaction key. The cam 443 has a low arcuate portion 448 connected by an inclined surface to a high arcuate portion 449 and a spring 450 (Fig. 16) is tensioned to urge the roller 442 into contact with the arcuate portions 448 and 449. It will be remembered that with the lever 417 (Fig. 16) in its counterclockwise position, as here shown, the arm 414 maintains the arm 410 in its counterclockwise position, in which position the projection 403 is out of the path of the foot 402 of the pawl 300. Shifting the lever 417 clockwise to its downward position rocks the arm 414 counterclockwise to surrender the control of the arm 410 to the cam 443.

Depressing any one of the single item transaction keys 172 (Fig. 3), by means of the differential mechanism 175, positions the cam 443 so that the low arcuate surface 448 is opposite the roller 442, as shown in Fig. 16. It is probably well to here state that the arm 437 remains in the position here shown in adding operations and is only shifted for a purpose later to be described, during totalizing recording operations. Therefore in adding operations, the roller 435, in cooperation with the slots 431 and 434 (Fig. 17), retains the arm 430 and associated parts connected to the yoke 432 in the relationship here shown. The low portion 448 of the cam 443 by means of the yoke 432, arm 430 and associated parts moves the arm 421 to its counterclockwise position as here shown. The arm 421 in co-operation with the stud 412 positions the arm 410 as here shown to retain the projection 403 of the arm 404 out of the path of the pawl 300. It is therefore evident that when one of the transaction keys 172 is depressed, the impression mechanism for the detail strip functions in the regular manner.

When one of the multiple item keys 171 or the key 158 (Fig. 3) is depressed, the differential mechanism 175 positions the cam 443 (Fig. 16) so that the high arcuate surface 449 is opposite the roller 442. This is effective to shift the yoke 432 and the arm 430 a slight distance counterclockwise. Counterclockwise movement of the arm 430, by means of the connections shown in Fig. 16, rocks the arm 421 clockwise, which movement, by means of the spring 422, is imparted to the arm 410. Clockwise movement of the arm 410 causes the camming slot therein, in cooperation with the stud 405, to shift the arm 404 counterclockwise to move the projection 403 in the path of the foot 402 of the pawl 300. The projection 403 disengages the pawl 300 from the disc 299, see space 6 of chart Fig. 39, to stop rotation of the cams 294 and 295 (Fig. 13) and 297 and 298 (Fig. 38) to disable the detail strip printing mechanism.

The cams 294 and 295, the cams 297 and 298 and the disc 299 are retained in disengaged position by means of a V-shaped notch, in the disc 306 (Figs. 5 and 15) which is integral with the above cams and disc and cooperates with a roller 407 carried by a spring pulled lever 408 rotatably supported by the shaft 292.

As previously stated, it is necessary to take a total or clear the multiple item totalizer at the end of each series of multiple item adding operations before a new operation can be initiated. It is desirable that a record be made of this multiple item clearing operation and this is accomplished in the following manner:

In a multiple item clearing operation counterclockwise movement of the zero stop throwout shaft 86 (Fig. 16) effected by the mechanism shown in Fig. 9, causes the arm 447, by means of the link 445, to impart counterclockwise movement to the arm 437. When the surface 449 of the cam 443 is opposite the roller 442, an extension 451 (Fig. 17) of the arm 433 is moved into contact with a collar 452 on the shaft 162, said yoke 432 thus being held immovable. Counterclockwise movement of the arm 437 shifts the link 436 downwardly (Fig. 16) causing the roller 435 guided by the slot 434 to shift the arm 430, the shaft 429, and the arm 428 clockwise. Clockwise movement of the arm 428 rocks the lever 425 counterclockwise, which movement is transmitted by the link 424 to the arm 423, the shaft 411 and the arm 421. Counterclockwise movement of the arm 421, in cooperation with the stud 412, imparts similar movement to the arm 410, causing the camming slot therein to rock the arm 404 clockwise to move the projection 403 thereon out of the path of the foot 402 of the pawl 300. This permits the impression operating cams to remain coupled to the disc 302, and it is therefore obvious that the detail strip impression mechanism functions during a multiple item clearing operation.

The return movement clockwise of the zero stop throwout shaft 86 (space 2, Fig. 40) and the arm 447 is slightly premature for the link 436 and the mechanism operated thereby. Consequently it is necessary to delay return movement of said link, and this is accomplished by means of a latch mechanism that retains the link 436 in moved position until the key lock shaft 68 (Fig. 16) is restored at the end of an operation. Compare spaces 2 and 3 of the chart Fig. 40 for the relative movements of shafts 68 and 86.

Secured on the key lock shaft 68 is an arm 453 connected by a link 454 to the upper end of a lever 455 fulcrumed on a stud 460 in the frame 51. Loose on the indicator shaft 162 is a latch 461 (Figs. 16 and 19) urged clockwise by a spring 462 to normally maintain a stud 463 carried thereby in contact with an angular surface on the upper edge of the link 454.

Depressing the machine starting bar 56 (Fig. 9) releases the key lock shaft 68 to the action of the spring 69 which rocks said shaft a slight distance clockwise, as viewed in Fig. 9 and counterclockwise as viewed in Fig. 16, to shift the link 454 forwardly to move the angular surface thereof away from the stud 463 to permit the spring 462 to rock the latch 461 clockwise until a flattened stud 464 carried by said latch contacts the upper surface of a projection 465 (see also Fig. 19) of the link 436. When the link 436 is shifted forwardly, in the manner explained above, the stud 464 moves into the path of the projection 465 to block return movement of said link under influence of the shaft 86, the slot in the link 445 permitting the arm 447 and the shaft 86 to move independently thereof. Return movement clockwise of the key lock shaft 68 (Fig. 16) at the end of machine operation causes the angular surface of the link 454 in cooperation with the stud 463 to disengage the stud 464 from the projection 465, thus permitting the spring 440 to return the link 436 upwardly to the position here shown, to return the projection 403 into the path of the foot 402. In multiple item reading operations, the mechanism shown in Fig. 16 functions in exactly the same manner as in resetting operations.

In reading and resetting operations of the No. 3 or transaction totalizer, under influence of the keys 172 (Fig. 3) the low arcuate surface 448 of the cam 443 (Fig. 16) is opposite the stud 442 to retain the projection 403 out of the path of the foot 402 as here shown. Reciprocation of the link 436 causes the roller 435 (Fig. 17) guided by the slot 431 to idly shift the yoke 432 first counterclockwise and then back to the position here shown. The idle shifting of the yoke 432 is caused by a forward concentric surface 466 (Fig. 14) of the arm 414, in cooperation with the stud 412, blocking counterclockwise movement of the arms 410 and 421, which through the connections shown in Fig. 16 blocks further clockwise movement of the arm 430.

*Consecutive number*

It will be remembered by referring to Figs. 25 and 31, that the present machine has a plurality of consecutive number type wheels 266 adapted to be fed step by step during certain machine operations to print a consecutive number upon the detail record strip 324. During the adding of single items, the consecutive number type wheels are fed each operation and consequently print a new number for each operation. In the first operation of a multiple item transaction, the consecutive number type wheels are advanced one step to print a new number for the multiple item transaction and thereafter remain stationary while the remaining items of this particular multiple item transaction are being added. During the enforced clearing operation, after a series of multiple items have been added, and in all other total recording operations the consecutive number feed remains inoperative. The consecutive number feed mechanism and the controlling means therefore will now be described in detail.

Directing attention to Figs. 25 and 31, the consecutive number wheels 266 are straddled by the arms of a yoke 467 loose on the shaft 268. A stud 468 (see also Fig. 23) extending between said arms of the yoke 467 rotatably supports a consecutive number feed pawl 469, the graduated teeth of which are urged into engagement with the teeth of ratchet wheels 456, secured respectively to each of the consecutive number type wheels 266, by a spring 470. Retaining pawls (not shown) of conventional construction cooperate with the ratchet 456 to prevent retrograde movement of the consecutive number type wheels. The left arm of the yoke 467 is secured to one end of the tube 393 (Fig. 25), which, it will be recalled, is rotatable on the shaft 268, while an arm 471 is secured to the other end of said tube 393. The arm 471 is connected by a link 472 (Figs. 21 and 31) to a lever 473, fulcrumed on a stationary stud 474 in the frame 72. The lever 473 has an L-shaped slot 475 through which extends a stud 476 in the forward end of a link 477. The rearward end of the link 477 is pivotally connected to the lower end of a lever 478 loose on the shaft 292. The lever 478 is operatively connected to a cam lever 479, loose on the shaft 292, by means of a stud 480 in said lever 478 which cooperates with a projection on the lever 479 and by means of a latch 481 pivoted on the upper end of the lever 478 and urged by a spring 482 clockwise into engagement with a locking notch in an upper extension of the lever 479. The latch 481 has a tail with an arcuate surface 483 (see also Fig. 26) which cooperates with a tappet 484 secured on the shaft 411. The cam lever 479 carries a roller 485 which cooperates with a camming groove 486 in the face of the gear 303, which, it will be recalled, meshes with the gear 304 driven by the clutch plate 312.

In adding operations, the stud 476 (Fig. 21) is retained in the downward branch of the L-shaped slot 475 by a curved slot 487 in a lever 488 pivoted on a stud 489 in the frame 72. A stud 490 in the upper end of the lever 488 extends within a camming slot 491 in an arm 492 secured to the zero stop throwout shaft 86. In total recording operations, counterclockwise movement of the arm 492 rocks the lever 488 clockwise to aline the stud 476 with the horizontal portion of the slot 475. This, together with the pawl 320 and clutch mechanism controlled thereby, disables the feed of the consecutive number during total recording operations in a manner to be fully described later. It will be recalled that the gear 303 makes one clockwise revolution in adding operations and in total recording operations said gear remains stationary during the first cycle thereof, due to the clutch mechanism 312, and in the second cycle of a total recording operation the clutch mechanism becomes effective to rotate said gear one revolution clockwise.

During the adding of single items the lever 478 (Figs. 21 and 26) remains latched to the cam lever 479 and the link 477 remains coupled to the lever 473 by means of the stud 476, in cooperation with the downward portion of the L-shaped slot 475, as here shown. It is therefore evident that in adding of single items the yoke 467 (see also Fig. 27 and space 5 Fig. 39) will be oscillated back and forth to advance the consecutive number type wheels one step each machine operation.

In the first of a series of multiple item operations, the cam 443 (Fig. 16) rocks the shaft 411 clockwise in the manner explained above, to cause the tappet 448 (Fig. 26) to rock the latch 481 out of engagement with the notch in the lever 479. However, this does not prevent the lever 479 in cooperation with the stud 480 from imparting counterclockwise feeding movement to said lever 478, which movement by means of the link 477, the lever 473 and the link 472 is imparted to the consecutive number feed yoke to advance the consecutive number type wheels one step. The lever 478 and connected mechanism remain in fed position due to the uncoupling of the latch 481, and remain thus during the balance of the multiple item operation and until the enforced multiple item clearing operation is performed.

Moving the total control lever from adding position to multiple item clearing position rocks the zero stop throwout shaft 86 (Fig. 21) a slight distance counterclockwise, in the manner explained previously herein, to move the latch 320 in the path of the pawl 310 to prevent rotation of the gears 304 and 303 during the first cycle of said reset operation. Near the end of the first cycle of the multiple item reset operation, the cycle control mechanism (Fig. 9) imparts additional counterclockwise movement to the shaft 86. This rocks the pawl 320 to ineffective position so that the gears 304 and 303 will rotate during the second cycle of said resetting operation and the cam groove 491 in the arm 492 shifts the lever 488 clockwise to lift the stud 476 into alinement with the horizontal portion of the slot 475. This movement of the arm 488 and the shifting of the stud 476 are of no importance in multiple item reset operations, its efficacy being confined to reading and resetting operations of single items.

Clockwise movement of the shaft 86 (Fig. 16) shifts the link 436 downwardly to impart counterclockwise movement to the shaft 411 in the manner explained herein before. Counterclockwise movement of the shaft 411 (Fig. 26) permits the latch 481, under influence of the spring 482, to be returned clockwise to effective position. Rotation of the gear 303 and initial movement counterclockwise of the lever 479 causes the notch in said lever to reengage the latch 481 whereupon the levers 478 and 479 return clockwise in unison to normal position, which by means of the link 477, the lever 473 and the link 472 and connected mechanism, returns the consecutive number feed yoke 467 Figs. 23 and 31) to unfed position in preparation for the succeeding operation.

After the levers 479 and 478 have completed their return movement clockwise, the shaft 86 (Fig. 21 and space 2, Fig. 40) is returned clockwise to reengage the stud 476 with the downward portion of the slot 475 and to rock the shaft 411 clockwise (Fig. 26) to cause the tappet 484 to disengage the latch 481 from the lever 479. The contour of the slot 491 in the arm 492 is such that initial movement counterclockwise of the shaft 86 caused by moving the total control lever 95 from adding to total recording position, imparts no movement to the lever 488.

In other reading and resetting operations, the pawl 320 (Fig. 21) disables the consecutive number feed mechanism during the first cycle of said resetting operation, the same as in multiple item reset operations, and near the end of said first cycle of operation further counterclockwise movement of the zero stop throwout shaft 86 under influence of the mechanism shown in Fig. 9 rocks the lever 488 clockwise to shift the stud 476 upwardly into alinement with the substantially horizontal portion of the slot 475. This movement of the shaft 86 moves the pawl 320 counterclockwise to ineffective position so that the gears 304 and 303 will rotate during the second cycle of a total recording operation. Oscillation of the levers 479 and 478 under influence of the groove 486 in the cam 303 causes the stud 476 to reciprocate idly in the horizontal portion of the slot 475 without imparting any movement to the lever 473 and connected mechanism. It is therefore obvious from the foregoing explanation that in reading and resetting operations, the consecutive number feed yoke 467 (Fig. 31) receives no movement whatever, and consequently the consecutive number type wheels 266 are not advanced.

In single item total recording operations, the low surface 448 of the cam 443 (Fig. 16) is opposite the roller 442. Consequently, the shaft 411 and the tappet 484 (Fig. 26) are positioned as here shown to render the latch 481 effective. It is probably well to again state that the resetting of the No. 1 or multiple item totalizer is compulsory after each series of multiple item adding operations. As is the case in single item total recording operations, the consecutive number feed does not function in subsequent multiple item reading and resetting operations.

*Resetting of consecutive number*

Mechanism is provided to reset the consecutive number type wheels to zero and said resetting mechanism is provided with a lock to prevent operation thereof by unauthorized persons.

Referring particularly to Figs. 21, 22, 25 and 27, secured on the shaft 268, that rotatably supports the consecutive number type wheels, is a pinion 493 which meshes with teeth in a segmental portion 494 of a consecutive number reset lever 495 rotatably supported by the shaft 274. The lever 495 terminates in a convenient fingerpiece, and manipulating said lever clockwise or forwardly turns the shaft 268 one counterclockwise revolution, causing a lateral groove 457 (Fig. 23) in said shaft, in cooperation with reset pawls 458 carried by each of the consecutive number type wheels 266, to reset said consecutive number type wheels to zero. Returning the lever 495 (Fig. 22) counterclockwise restores the shaft 268 clockwise to normal position, in which it is here shown.

A full-stroke device enforces a complete revolution of the shaft 268 in either direction. The full-stroke device consists of a disc 496 (Fig. 21) secured on the shaft 268 and having in the periphery thereof regularly spaced V-shaped notches, which, in cooperation with the tooth of a spring actuated full-stroke pawl 497 pivoted at 498 to the frame 72, prevents backing up the disc 496 and the shaft 268 until they have made a complete revolution. An enlarged notch 499 in the disc 496 permits the full-stroke pawl 497 to reverse its position when the shaft 268 has made a complete revolution. Further description of the full-stroke device is deemed unnecessary, as it is of conventional design and well known in the art.

Mechanism is provided to prevent the operation of the machine while the consecutive number type wheels are being reset. Such mechanism includes a link 500 (Figs. 21 and 22) which pivotally connect the lever 495 to a crank 501 secured on a shaft 502 journaled in the frames 51 and 72. Also secured on the shaft 502 is a segmental gear 503 which meshes with a gear 504 secured on a shaft 505 journaled in the frames 51, 72 and 232 (see also Fig. 5). Manipulation of the lever 495 back and forth, by means of the link 500 and the segment 503, oscillates the gear 504 and the shaft 505 through 180 degrees of movement to reset the consecutive number type wheels in the side receipt printer (not shown).

The gear 504 meshes with a gear 506 loose on a stud 507 in the frame 51, and integral with a disc 508 having therein a notch adapted to receive a stud 509 in a latch 510 loose on the upper or #1 totalizer reset shaft 65 journaled in the frames 50 and 51. The latch 510 is adapted to cooperate with a hook-shaped arm 512 secured on the key lock shaft 68. Initial movement clockwise of the lever 495 by means of the link 500 and connected mechanism, rotates the gear 506 and the disc 508 clockwise causing the notch in said disc to rock the latch 510 counterclockwise over the hook-shaped arm 512 to obstruct counterclockwise releasing movement of the key lock shaft 68. The periphery of the disc 508, in cooperation with the stud 509, retains the latch 510 in effective position until the lever 495 completes its full stroke back and forth and is returned fully to normal position, as here shown, in which position the notch in the disc 508 coincides with the stud 509 and an extended wall 513 of said notch engages the stud 509 and rocks the latch 510 clockwise to ineffective position.

The consecutive number resetting lever 495 (Figs. 21, 22, 24 and 27) is held in normal position by means of a lock 514 mounted on a plate 515 secured to the bar 270. Locking the lock 514 raises a plunger 516 thereof, causing an aperture in said plunger, in cooperation with the rounded nose of an arm 517 loose on the type wheel aliner shaft 281, to rock said arm 517 counterclockwise, as viewed in Fig. 21, and upwardly as viewed in Figs. 24 and 27. The arm 517 is connected by the sleeve 518 to a crank 519 and consequently said crank moves counterclockwise in unison therewith. The arm 519 carries a stud 520 embraced by the bifurcated lower end of a locking pawl 521 fulcrumed on the shaft 274. The upper end of the locking pawl 521 is adapted to cooperate with a stud 522 in the full stroke disc 496. Counterclockwise movement of the arm 519 rocks the pawl 521 clockwise to move the upper end thereof into the path of the stud 522 to obstruct initial movement counterclockwise of the disc 496 to prevent unauthorized persons from resetting the consecutive number type wheels. Obviously, unlocking the lock 514 reverses the movements outlined above to rock the pawl 521 out of the path of the stud 522.

The flexibility of the machine embodying this invention makes it adaptable to various business systems, and for this reason it is believed unnecessary to describe a specific system of operation in connection therewith. Likewise, it is felt that a sufficient understanding of the functioning of said machine will have been obtained from the foregoing description.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow:

What is claimed is:

1. In a machine of the character described, having printing means, means to operate the printing means, and a clutch device to connect the operating means to the printing means, the combination of a differentially positioned member; an element; yieldable means connecting the member to the element through which the member can move the element; a part shiftable by the element to an effective position for disengaging the clutch device to disable the printing means; and manually operable means cooperating with the element to block movement thereof by the differentially positioned member to retain the part in an ineffective position to render the printing means effective at all times.

2. In a machine of the class described, capable of various types of operations and having printing means, the combination of means including a member and an element to control the printing means; means connecting the member and the element and movable with and relative to the member and the element; means to move the member and through the connecting means to move the element with the member the same distance as the member to control the printing means in certain operations; and means to move the connecting means relative to the element and member and, through the cooperation between the connecting means, the member, and the element, moving the element relatively to the member to control the printing means in certain other operations.

3. In a machine of the character described, capable of various kinds of operations and having printing means, the combination of a member containing a straight slot; an element containing an irregular slot; means cooperating with said slots for connecting the member and the element; means to move the member and through the connecting means to move the element in unison the same distance as the member to control the printing means in certain operations; means to move the connecting means in said slots to cam the element relatively to the member to control the printing means in certain other operations; and means to prevent the member and the element from controlling the printing means.

4. In a machine of the character described, capable of various kinds of operations, and having printing means, means to operate the printing means, and a clutch device to connect the printing means and the operating means for the purpose of governing the operation of said printing means, the combination of shiftable means to control the clutch; a member; an element operatively connected to the shiftable means; means to operatively connect the member and the element; means to move the element and the member in unison to control the shiftable means in certain operations; and means cooperating with the connecting means for the member and the element to move the element relatively to the member to control the shiftable means in certain other operations.

5. In a machine of the character described, capable of various kinds of operations, and having printing means, means to operate the printing means, and a clutch device to connect the printing means and the operating means for the purpose of governing the operation of said printing means, the combination of shiftable means to control the clutch; a member; an element operatively connected to the shiftable means; means to operatively connect the member and the element; means to move the element and the member in unison, to control the shiftable means in certain kinds of operations; means cooperating with the connecting means for the member and the element to move the element relatively to the member to control the shiftable means in certain other kinds of operations; and means to retain the shiftable means inoperative irrespective of the member and the element.

6. In a machine of the class described, capable of various types of operations, and having printing means, means to operate the printing means, and a clutch device to connect the printing means and the operating means for the purpose of governing the operation of said printing means, the combination of means to disengage the clutch device; shiftable means to move the disengaging means to and from disengaging position; a member; an element operatively connected to the shiftable means; means connecting the member and the element; means cooperating with the member to move the element and the member in unison to operate the shiftable means to move the disengaging means to and from disengaging position in certain types of operations; and means whereby the connecting means moves the element relatively to the member to operate the shiftable means to move the disengaging means away from disengaging position to render the printing means operative in certain other types of operations.

7. In a machine of the character described, capable of various types of operations, and having printing means, means to operate the printing means, a clutch device to connect the printing means to the operating means for the purpose of governing the operation of said printing means, and a plurality of control devices to effect certain types of operations, the combination of means to disengage the clutch device; a part adapted to shift the clutch disengaging means to and from disengaging position; a member; an element; instrumentalities connecting the element to the part; means to connect the member and the element; means cooperating with the member and positioned by certain of the controlling devices to operate the part to move the clutch disengaging means to and from disengaging position, depending upon the type of operation being performed; and means governed by a particular control device and cooperating with the connecting means for the member and the element to move the element relatively to the member to actuate the part to move the clutch disengaging means away from disengaging position in certain types of operations.

8. In a machine of the character described, capable of various types of operations, and having printing means, means to operate the printing means, a clutch device to connect the printing means to the operating means for the purpose of governing the operation of said printing means, and a plurality of control devices to condition the machine for various types of operations, the combination of means to disengage the clutch device; a part to shift the clutch disengaging means to and from disengaging position; a member; an element, instrumentalities connecting the element to the part; means cooperating with the member and positioned by certain of the controlling devices to operate the part to move the clutch disengaging means to and from disengaging position, depending upon the type of operation being performed; means governed by a particular control device and cooperating with the connecting means for the member and the elements to move the element relatively to the member to operate the part to move the clutch disengaging means away from disengaging position in certain types of operations; and manipulative means cooperating with the part to retain the clutch disengaging means out of disengaging position at all times.

9. In a machine of the class described, arranged to perform a multiple-item operation consisting of a series of multiple item entering operations followed by a clearing operation, and having printing means, means to drive the printing means, and a clutch mechanism to connect the driving means to the printing means, the combination of means to disengage the clutch; means to shift the disengaging means to and from disengaging position; a differentially positioned member; connections between the member and the shifting means whereby positioning of the member in multiple item entering operations moves the disengaging means to effective position to disable the printing means; means effective in the subsequent clearing operation and cooperating with the connections between the member and the shifting means to render the disabling means ineffective; and manually operated means cooperating with the shifting means to retain the disabling means in ineffective position at all times.

10. In a machine of the class described, arranged to perform a multiple-item operation consisting of a series of multiple item entry operations followed by a clearing operation, and having printing means, means to drive the printing means and a clutch device to connect the driving means to the printing means, the combination of means to disengage the clutch device; means to shift the disengaging means to and from disengaging position; a differentially positioned member; an element actuated by the member; a part; means connecting the part to the element; connections between the part and the shifting means whereby positioning of the member in multiple item entering operations moves the part and the element in unison to shift the disengaging means to effective position to disable the printing means; means effective in the subsequent clearing operation and cooperating with the connecting means for the part and the element to shift said part independently of said element to move the disabling means to ineffective position to enable the printing means; and manually operated means cooperating with the shifting means to retain the disabling means in ineffective position at all times.

11. In a machine of the class described, having printing means; mechanism to control the operation of the printing means to print single item transactions and totals of multiple item transactions; manipulative devices; consecutive numbering mechanism to consecutively number the transactions printed; and actuating means for the consecutive numbering mechanism, the combination of a control element differentially set under control of the manipulative devices to control the printing control mechanism and also to control said consecutive numbering mechanism actuating means to advance the consecutive numbering mechanism one unit each time a single item transaction is printed and to advance the consecutive numbering mechanism one unit during the operation in which the first item of a multiple item transaction is printed, and to disable the consecutive numbering mechanism during all subsequent item printing operations of a multiple item transaction; means operable during total printing operations to modify the control effected by the element to restore said disabling means; and other means to disable the consecutive number mechanism during total printing operations.

12. In a machine of the class described, having printing means; mechanism to control the operation of the printing means in machine operations in which single item transactions, and totals of multiple item transactions are printed; manipulative devices; consecutive numbering mechanism to consecutively number the transactions printed; and actuating means for the consecutive numbering mechanism, the combination of a control element differentially set under control of the manipulative devices and operable to control the operation of the printing mechanism control mechanism; means settable by the control element and operable to control the consecutive numbering mechanism whereby the consecutive numbering actuating means is disabled after the consecutive numbering mechanism is advanced one unit by the actuating means during an operation in which the first item of a multiple item transaction is printed; and means settable as an incident to total printing operations to control the consecutive numbering actuating means during the total printing operation to enable the consecutive numbering actuating means for an item entering operation following a total printing operation.

13. In a machine of the class described, having printing means; mechanism adjustable to control the operation of the printing means to print single item transactions, and totals of multiple item transactions; manipulative devices; consecutive numbering mechanism to consecutively number the transactions printed; and actuating means for the consecutive numbering mechanism, the combination of a control element differentially set under control of the manipulative devices; means operated by the control element to adjust the adjustable printing control mechanism; means to operate the consecutive numbering actuating means; a coupling device between the last named means and the consecutive numbering actuating means to restore the actuating means to a position of rest; means actuated by the means operated by the control element during the operation in which the first item of a multiple item transaction is printed to disable the coupling device whereby said consecutive numbering actuating means is left in its actuated position; and means operable as an incident to an operation during which the total of the multiple item transaction is printed to readjust the means operated by the control element to enable the consecutive numbering actuating means to be restored to its position of rest to enable the operating means for the actuating means to advance the consecutive numbering mechanism one unit during the next item printing operation.

14. In a machine of the class described, having printing means and means to operate the printing means, the combination of means for controlling the operation of the printing means by the operating means; a differentially positionable member; means yieldingly connecting the control means to the member for operation thereby to control the operation of the printing means by the printer operating means; and means cooperable with the control means to retain the control means in a predetermined position to cause the yielding connection to yield and allow the control means to remain in the predetermined position, irrespective of any movement which the member would tend to impart to the control means, to render the printing means operable by its operating means at all times.

15. In a machine capable of performing various types of operations and having printing means, the combination of means settable to control the operation of the printing means; a device differentially movable in certain types of operations; a member cooperating with the device and movable thereby; an element; means coupling the member to the element for movement together and for relative movement; means connecting the element to the control means so that the control means is set by the differential device; and means for moving the coupling means to cause relative movement between the member and the element, after the member has been moved by the device, to thereby readjust the control means in certain types of operations even though the device remains in its moved position.

16. In a machine adapted to perform single and multiple item transactions and having printing means, operating means for said printing means, a consecutive numbering mechanism, actuating means movable from a normal position to actuate the consecutive numbering mechanism, operating means for said actuating means, and means including a latch for connecting the actuating means to its operating means, the combination of a member differentially settable in single item and multiple item transactions; shiftable means shifted by said member when it is set in multiple item transactions and including an element to prevent the operation of the printing means by the printer operating means and another element to engage the latch to unlatch the actuating means from its operating means after the actuating means has moved from its normal position during the first operation of a multiple item transaction; and means operable during the printing of a multiple item total, to further shift said shiftable means to cause the elements to allow the printing means to be operated by its operating means and to release the latch so that it can couple the actuating means to its operating means for return to its normal position.

JOHN B. GEERS.
ARTHUR R. COLLEY.